United States Patent
Ling et al.

(10) Patent No.: US 10,051,406 B2
(45) Date of Patent: Aug. 14, 2018

(54) METHOD AND SYSTEM FOR BROADBAND NEAR-FIELD COMMUNICATION (BNC) UTILIZING FULL SPECTRUM CAPTURE (FSC) SUPPORTING CONCURRENT CHARGING AND COMMUNICATION

(71) Applicant: MAXLINEAR, INC., Carlsbad, CA (US)

(72) Inventors: Curtis Ling, Carlsbad, CA (US); Timothy Gallagher, Encinitas, CA (US)

(73) Assignee: Maxlinear, Inc., Carlsbad, CA (US)

( * ) Notice: Subject to any disclaimer, the term of this patent is extended or adjusted under 35 U.S.C. 154(b) by 538 days.

(21) Appl. No.: 13/726,994

(22) Filed: Dec. 26, 2012

(65) Prior Publication Data

US 2013/0210347 A1 Aug. 15, 2013

Related U.S. Application Data

(60) Provisional application No. 61/605,001, filed on Feb. 29, 2012, provisional application No. 61/599,045, filed on Feb. 15, 2012.

(51) Int. Cl.
*H04W 4/00* (2018.01)
*H04B 5/00* (2006.01)
(Continued)

(52) U.S. Cl.
CPC ............ *H04W 4/008* (2013.01); *G01S 11/06* (2013.01); *G06F 3/0481* (2013.01); *H04B 5/00* (2013.01);
(Continued)

(58) Field of Classification Search
CPC combination set(s) only.
See application file for complete search history.

(56) References Cited

U.S. PATENT DOCUMENTS 7,844,505 B1 * 11/2010 Arneson et al. ............... 705/28
8,686,685 B2 *  4/2014 Moshfeghi ............ H02J 50/20
                                                       320/108

(Continued)

OTHER PUBLICATIONS

Lai "Low-profile broadband RFID tag antennas mountable on metallic objects", Antennas and Propagation Society International Symposium (APSURSI), 2010 IEEE, pp. 1-4, Jul. 11-17, 2010.*

*Primary Examiner* — Junpeng Chen
(74) *Attorney, Agent, or Firm* — McAndrews, Held & Malloy, Ltd.

(57) ABSTRACT

A charging device includes an integrated broadband transceiver that is operable to communicate wireless signals at a power level that is below a spurious emissions mask. The wireless signals are communicated over a designated frequency spectrum band via one or more antennas. The wireless signals convey data between the charging device and a communication device via one or more usable channels within the frequency spectrum band utilized by the integrated broadband transceiver. Concurrent with the communicating, charging of the communication device occurs. One or more usable channels within the frequency spectrum band utilized by the integrated broadband transceiver may be detected. The charging and the communication of the wireless signals occurs currently on the same ones or different ones of the one or more antennas. The detected one or more usable channels may be aggregated and utilized for the communication by the integrated broadband transceiver.

18 Claims, 12 Drawing Sheets

(51) Int. Cl.
    *H04B 17/309*     (2015.01)
    *H04W 12/08*     (2009.01)
    *H04B 17/318*     (2015.01)
    *G01S 11/06*     (2006.01)
    *G06F 3/0481*     (2013.01)
    *H04W 52/28*     (2009.01)
    *H04W 72/04*     (2009.01)
    *H04W 4/80*     (2018.01)
    *H04W 76/10*     (2018.01)
    *H04W 84/18*     (2009.01)

(52) U.S. Cl.
    CPC ......... *H04B 5/0037* (2013.01); *H04B 17/309* (2015.01); *H04B 17/318* (2015.01); *H04W 4/80* (2018.02); *H04W 12/08* (2013.01); *H04W 52/283* (2013.01); *H04W 72/0453* (2013.01); *H04W 76/10* (2018.02); *H04W 84/18* (2013.01)

(56) References Cited

U.S. PATENT DOCUMENTS

| | | | |
|---|---|---|---|
| 2004/0252776 A1* | 12/2004 | Balakrishnan | H04L 27/2602 375/260 |
| 2011/0164471 A1* | 7/2011 | Baarman et al. | 368/10 |
| 2011/0248668 A1* | 10/2011 | Davis | H01M 10/48 320/106 |
| 2013/0210345 A1 | 8/2013 | Ling et al. | |
| 2013/0210346 A1 | 8/2013 | Ling et al. | |
| 2013/0210352 A1 | 8/2013 | Ling et al. | |

* cited by examiner

METHOD AND SYSTEM FOR BROADBAND NEAR-FIELD COMMUNICATION (BNC) UTILIZING FULL SPECTRUM CAPTURE (FSC) SUPPORTING CONCURRENT CHARGING AND COMMUNICATION

CROSS-REFERENCE TO RELATED APPLICATIONS/INCORPORATION BY REFERENCE

This patent application makes reference to, claims priority to, and claims benefit from U.S. Provisional Application Ser. No. 61/599,045, which was filed on Feb. 15, 2012.

This patent application also makes reference to, claims priority to, and claims benefit from U.S. Provisional Application Ser. No. 61/605,001, which was filed on Feb. 29, 2012.

This application also makes reference to:
U.S. application Ser. No. 13/726,965, which is filed on even date herewith; and
U.S. application Ser. No. 13/723,897, which was filed on Dec. 21, 2012.

Each of the above stated applications is hereby incorporated herein by reference in its entirety.

FIELD OF THE INVENTION

Certain embodiments of the invention relate to communication systems. More specifically, certain embodiments of the invention relate to a method and system for Broadband Near-Field Communication (BNC) utilizing Full Spectrum Capture (FSC) supporting concurrent charging and communication.

BACKGROUND OF THE INVENTION

Near-Field Communication (NFC) is a new short-range, standards-based wireless connectivity technology that uses magnetic field induction to enable communication between electronic devices in close proximity. Based on radio frequency identification (RFID) technologies, NFC provides a medium for the identification protocols that validate secure data transfer. NFC enables users to perform intuitive, safe, contactless transactions, access digital content and connect electronic devices simply by touching or bringing devices into close proximity. NCF enables concurrent charging of and communication.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for Broadband Near-Field Communication (BNC) utilizing Full Spectrum Capture (FSC) supporting concurrent charging and communication, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
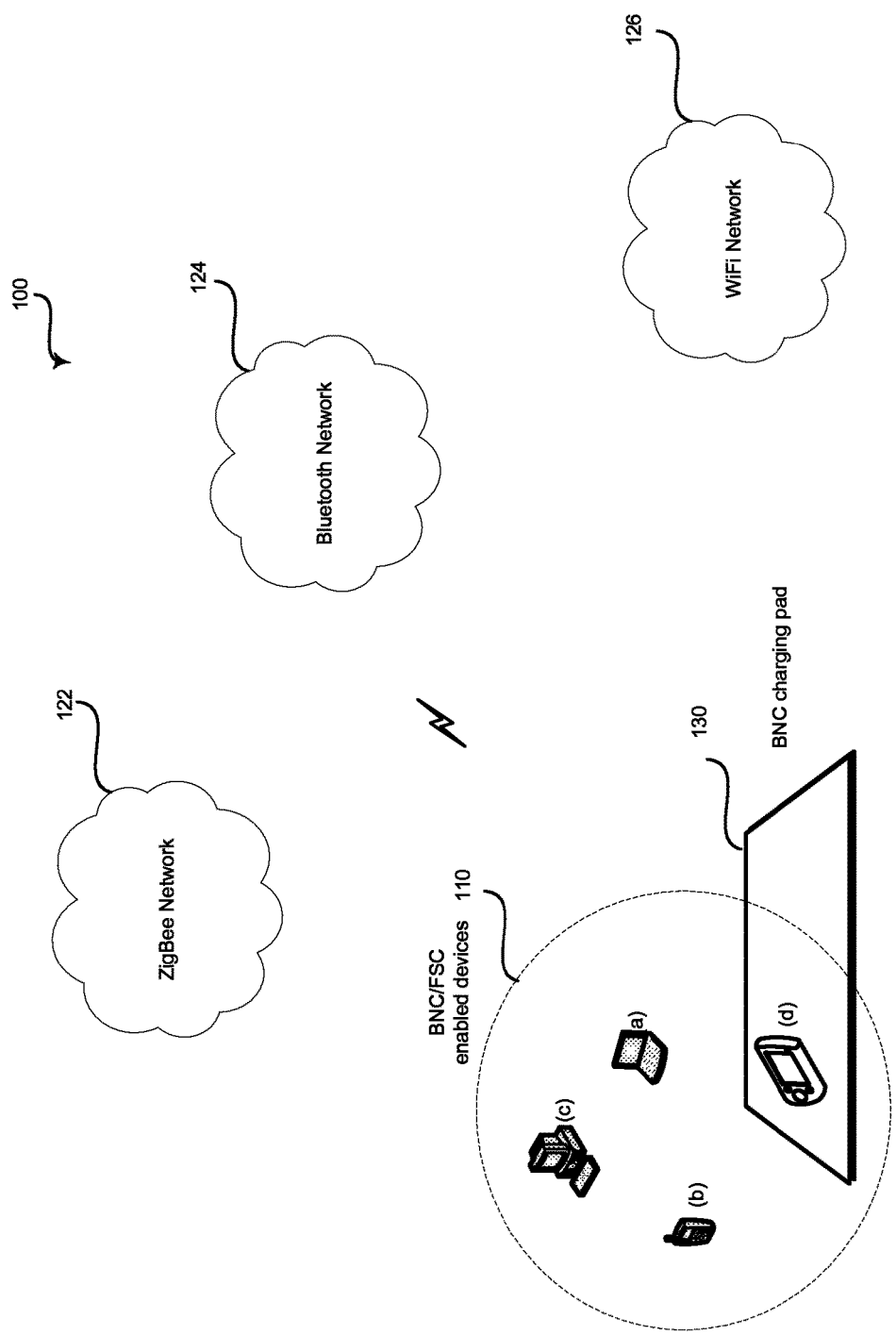
FIG. 1 is a diagram that illustrates an exemplary communication system, such as a Broadband Near Field Communication (BNC) system, that utilizes full spectrum capture (FSC), in accordance with an exemplary embodiment of the invention.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Certain embodiments of the invention may be found in a method and system for Broadband Near-Field Communication (BNC) utilizing Full Spectrum Capture (FSC) supporting concurrent charging and communication. In various exemplary embodiments of the invention, a charging device, for example the BNC charging pad 1000, includes an integrated broadband transceiver, for example and integrated BNC/FSC transceiver, which is operable to communicate wireless signals at a power level that is below a spurious emissions mask. The wireless signals may be communicated over a designated frequency spectrum band via one or more antennas. The wireless signals may convey data between the charging device and a communication device via one or more usable channels within the frequency spectrum band utilized by the integrated broadband transceiver 1010. Charging of the communication device may occur concurrent with the communicating of the wireless signals. The charging and the communication of the wireless signals may occur currently on the same ones of at least a portion of the one or more antennas or on different ones of at least a portion of the one or more antennas. In addition to BNC/FSC devices sharing antennas and/or circuitry with wireless power devices, the BNC/FSC devices may also share antenna and/or circuits with NFC devices. In other embodiments of the invention, the BNC devices may also share antenna and/or circuits with wireless power devices and also with NFC devices.

One or more usable channels within the frequency spectrum band utilized by the integrated broadband transceiver may be detected. The detected one or more usable channels may be aggregated and utilized for the communication by the integrated broadband transceiver. In various embodiment of the invention, the charging device may comprise other types of charging devices and is not limited to the BNC charging pad 1000.

The charging device may be coupled with the communication device to enable the charging. One or more coils within the charging device may be energized to enable the coupling. A current may be generated in one or more coils within the charging device utilizing the communicating to enable the energizing. One or more of the coils within the communication device may be energized to enable said charging. The method according to claim 1, comprising pairing said integrated broadband transceiver with said communication device. The integrated broadband transceiver with may be configured with security levels during the pairing. The communicating of the data with the communication device may occur based on a selected one of the security levels. The transfer of energy between the BNC charging device and the BNC/FSC enabled device may occur through inductive coupling. As utilized herein, "inductive coupling" may comprise electrical induction (commonly referred to as "capacitive coupling"), magnetic induction (commonly referred to by the same term "inductive coupling") and/or an electromagnetic induction. It is to be understood that "inductive coupling," as utilized herein, may include one or more of the inductive coupling methods or any combination thereof.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "exemplary" means serving as a non-limiting example, instance, or illustration. As utilized herein, the term "e.g.," introduces a list of one or more non-limiting examples, instances, or illustrations.

FIG. 1 is a diagram that illustrates an exemplary communication system, such as a Broadband Near Field Communication (BNC) system, that utilizes full spectrum capture (FSC), in accordance with an exemplary embodiment of the invention. Referring to FIG. 1, there is shown a BNC system 100 comprising a plurality of BNC/FSC enabled devices 110(*a*) through 110(*d*), a BNC charging pad 130, and associated communication networks 122 through 126.

A BNC/FSC enabled device such as the BNC/FSC enabled device 110(*d*) may comprise suitable logic, circuitry, code, and/or interfaces that may be operable to perform Broadband Near-Field Communication (BNC) with other BNC/FSC enabled devices. In this regard, the BNC/FSC enabled device 110(*d*) may exchange or communicate various types of data, such as, for example, applications, telephone numbers, pictures, multimedia content, files (e.g., MP3 files), digital authorizations, and/or device components (e.g., a display) with other BNC/FSC enabled devices such as the BNC/FSC enabled devices 110(*a*), 110(*b*) and 110(*c*). For data transmission with BNC, a BNC enabled device that initiates the data transmission refers to a polling device (initiator), while a BNC enabled device that is targeted by the polling device refers to a listening device. A BNC enabled device such as the BNC/FSC enabled device 110(*d*) may operate in a reader/writer mode (active mode), a card emulation mode (passive mode), or a peer-to-peer mode. In active mode, the BNC/FSC enabled device 110(*d*) is active and reads or writes to a passive legacy RFID tag. In passive mode, the BNC/FSC enabled device 110(*d*) behaves like an existing contactless card conforming to one of the legacy standards. In peer-to-peer mode, the BNC/FSC enabled device 110(*d*) and its peer BNC enabled device such as the BNC/FSC enabled device 110(*b*) may exchange or communicate information. In this regard, the initiator device (polling device) may require less power compared to the reader/writer mode. Depending on device capacities, the BNC/FSC enabled devices 110(*a*)-110(*d*) may coexist with or support other wireless technologies such as, for example, ZigBee, Bluetooth, WLAN, and WiMax. In this regard, the BNC/FSC enabled devices 110(*a*) and 110(*d*) may operate in various spectrum bands. For example, with Zigbee enabled, the BNC/FSC enabled devices 110(*a*)-110(*d*) may operate in 868 MHz, 915 MHz or 2.4 GHz frequency bands. With Bluetooth enabled, the BNC/FSC enabled devices 110(*a*)-110(*d*) may operate within the 2.4 GHz band. With WLAN enabled, the BNC/FSC enabled devices 110(*a*)-110(*d*) may operate within the 2.4, 3.6 and 5 GHz frequency bands. With fixed WiMAX enabled, the BNC/FSC enabled devices 110(*a*)-110(*d*) may operate in the 2.5 GHz and 3.5 GHz frequency bands, which require a license, as well as the license-free 5.8 GHz band. With mobile WiMAX enabled, the BNC/FSC enabled devices 110(a)-110(d) may operate in the 2.3-2.4 GHz, 2.5-2.7 GHz, 3.3-3.4 GHz and 3.4-3.8 GHz frequency bands.

In an exemplary embodiment of the invention, the BNC/FSC enabled device 110(d) may be operable to utilize full-spectrum capture technology to meet the challenging demands of operators, consumers, and hardware vendors while providing efficient scalability for future development. In this regard, the BNC/FSC enabled device 110(d) may be operable to digitize the entire operation spectrum band, 1 GHz, for example, for instant access to channels anywhere in the operation spectrum band. The BNC/FSC enabled device 110(d) may utilize BNC together with Full Spectrum Capture to provide BNC/FSC hybrid solutions for proliferating data or content delivery and services throughout the home and to connected devices such as the BNC/FSC enabled devices 110(a)-110(c). Aspects of Full Spectrum Capture may be found in U.S. application Ser. No. 13/485,003 filed on May 31, 2012, U.S. application Ser. No. 13/336,451 filed on Dec. 23, 2011 and U.S. Application 61/532,098 filed on Sep. 7, 2011. Each of these applications is hereby incorporated herein by reference in its entirety.

In an exemplary embodiment of the invention, the BNC/FSC enabled device 110(d), may be placed on a charging device, such as the BNC charging pad 130 for example. The BNC/FSC enabled device 110(d) may concurrently be charged by the BNC charging pad 130, and transfer high band-width data to an external device, such as the external device 903 depicted in and described with respect to FIG. 9, for example.

The ZigBee network 122 may comprise suitable logic, circuitry, code, and/or interfaces that may be operable to provide data services to various ZigBee-based devices such as the BNC/FSC enabled devices 110(a)-110(d) using ZigBee technology. ZigBee is a standard that defines a set of communication protocols on top of the IEEE 802.15.4 Radio Protocol for low-data-rate short-range wireless networking. For example, the ZigBee network 122 may incorporate ZigBee radios to operate at 1 mW RF power and to go to sleep when not involved in transmission so as to minimize power consumption and promote long battery life in battery-powered devices.

The Bluetooth network 124 may comprise suitable logic, circuitry, interfaces and/or code that may be operable to provide data services to various Bluetooth-based mobile devices such as the BNC/FSC enabled devices 110a-110c using Bluetooth technology. A Bluetooth-based mobile device such as the BNC/FSC enabled device 110a may be operable to communicate Bluetooth radio frequency signals with peer Bluetooth devices such as the BNC/FSC enabled devices 110(b)-110(c) for various data services such as SMS/MMS and mobile TV, for example.

The WiFi network 126 may comprise suitable logic, devices, interfaces and/or code that may be operable to provide data services to various mobile devices such as the BNC/FSC enabled devices 110(a)-110(d) by using WiFi technology. A WiFi-based mobile device such as the BNC/FSC enabled device 110a may be operable to communicate WiFi radio frequency signals with peer WiFi devices such as the BNC/FSC enabled devices 110(b)-110(c) for various data services such as SMS/MMS and mobile TV, for example.

Figure 9:
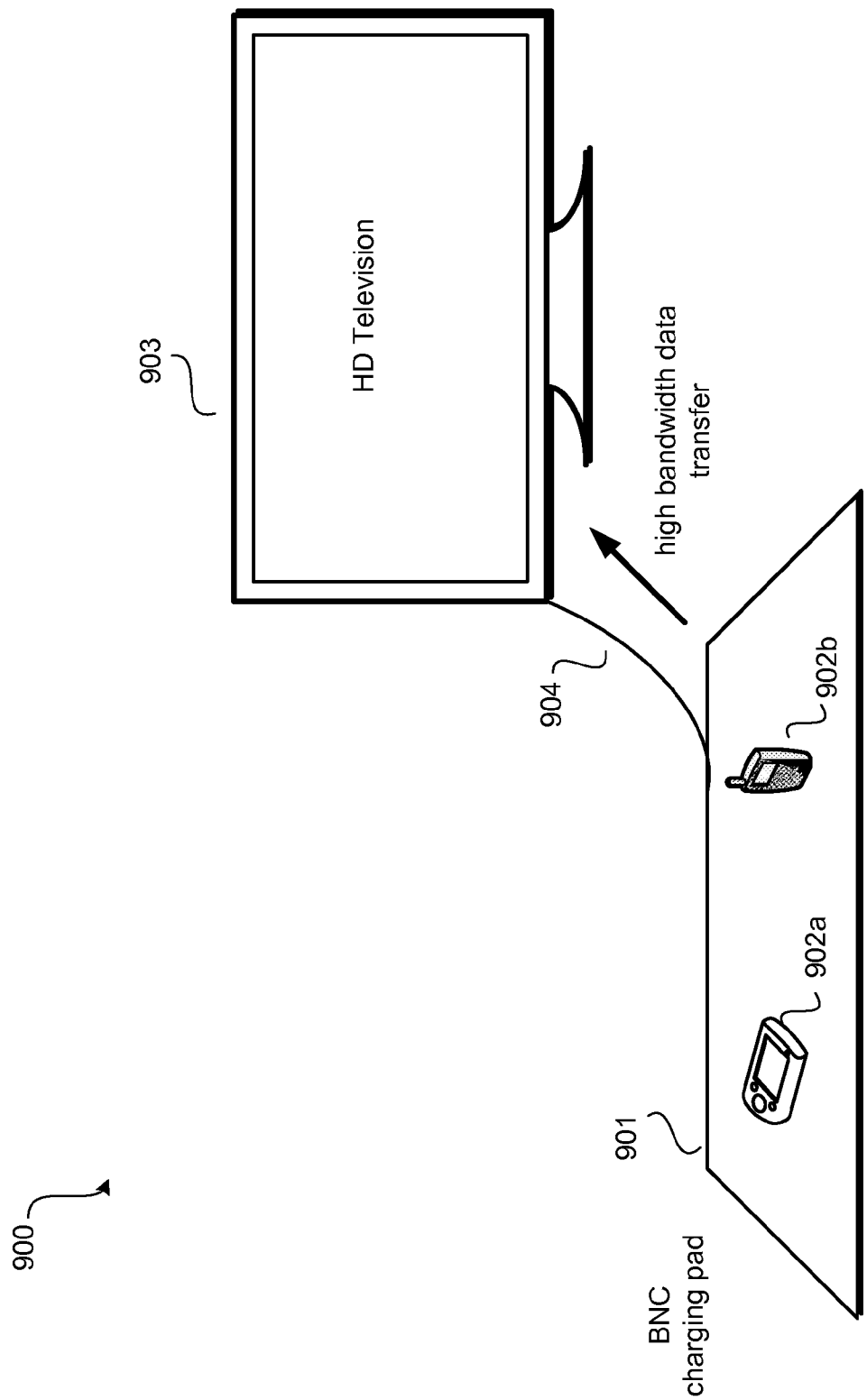
FIG. 9 is a diagram showing an exemplary near-field charging and communication system 900 that utilizes, for example, BNC/FSC, in accordance with an exemplary embodiment of the invention.

The BNC charging pad 130 may comprise suitable logic, circuitry, code and interfaces that may be operable to charge a BNC/FSC enabled devices such as the BNC/FSC enabled device 110(d), and concurrently facilitate high bandwidth data transfer from the BNC/FSC enabled device 110(d) an external device, such as the external device 903 depicted in and described with respect to FIG. 9 for example.

In an exemplary operation, the BNC/FSC enabled devices 110(a)-110(d) may provide BNC/FSC hybrid solutions for signal or data transmission at power densities through associated communication networks such as the Bluetooth network 124 for example. To support the data transmission with BNC, the BNC/FSC enabled devices 110(a)-110(d) may be configured to utilize Full Spectrum Capture in order to detect usable channels and aggregate the usable channels to increase channel bandwidth for the data transmission. In one exemplary embodiment of the invention, for transmission, the data transmission may be carried or transmitted over a single channel within the operating spectrum band. However, for reception, multiple reference elements or signals such as pilot signals may be utilized to determine or detect which of channels in the operating spectrum band may be indeed usable.

In another exemplary operation, a BNC/FSC enabled device such as the BNC/FSC enabled device 110(d) may be placed on a charging device, such as the BNC charging pad 130, for example. In this regard the BNC charging pad 130 may charge the BNC/FSC enabled device 110(d) and concurrently facilitate communication of high bandwidth data from the BNC/FSC enabled device 110(d) to an external device, such as the external device 903 depicted in and described with respect to FIG. 9 for example. In an exemplary embodiment of the invention, the BNC charging pad 130 may initiate and manage a transfer of random data from the external device 903 so as to initiate current flow in all or some of the components of the BNC charging pad 130. The current flow generated by transfer of random data from the external device 903 may be used to charge the BNC/FSC enabled device 110(d) through an inductive coupling device, a capacitive coupling device, a coil, and/or other power transfer device. Concurrently with charging the BNC/FSC enabled device 110(d), the BNC charging pad 130 may facilitate high bandwidth data transfer from the BNC/FSC enabled device 110(d) to the external device 903. In this regard, when the BNC/FSC enabled device 110(d) initiates a high bandwidth data transfer to BNC charging pad 130, the BNC charging pad may stop the transfer of random data from the external device 903, facilitate transfer of the high bandwidth data to the external device 903 and concurrently charge the BNC/FSC enabled device 110(d) utilizing current flow generated by the high bandwidth data transfer from the BNC/FSC enabled device.

BNC devices may be operable to share antennas and/or circuitry with wireless power devices. BNC devices may also be operable to share antennas and/or circuits with NFC devices. Additionally, BNC devices may also be operable to share antenna and/or circuits with wireless power devices and also with NFC devices.

Figure 2:
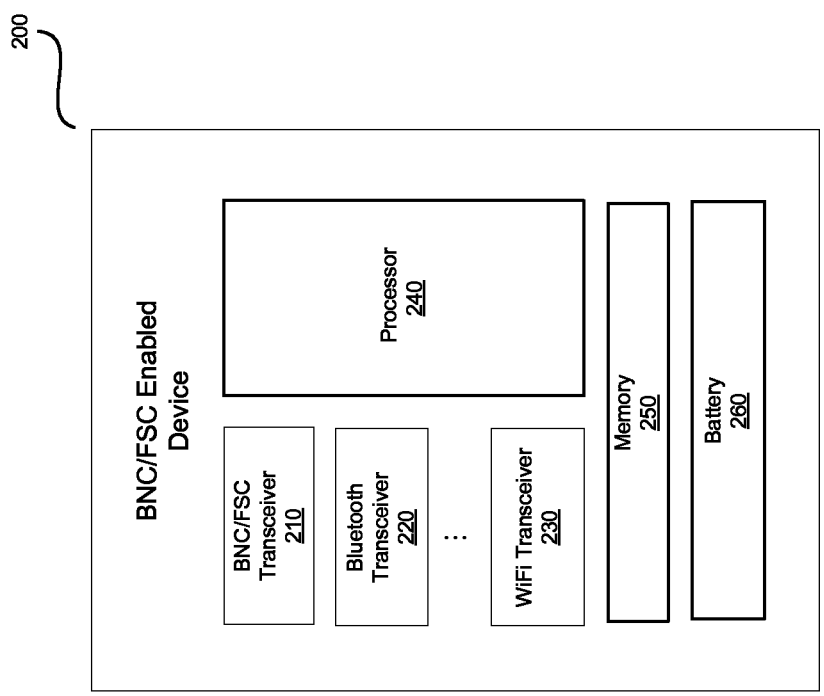
FIG. 2 is a block diagram that illustrates an exemplary device that performs, for example, Broadband Near Field Communication (BNC) utilizing full spectrum capture (FSC), in accordance with an exemplary embodiment of the invention.

FIG. 2 is a block diagram that illustrates an exemplary device that performs, for example, Broadband Near Field Communication (BNC) utilizing full spectrum capture (FSC), in accordance with an exemplary embodiment of the invention. Referring to FIG. 2, there is shown a BNC/FSC enabled device 200 comprising a BNC/FSC transceiver 210, a Bluetooth transceiver 220, a WiFi transceiver 230, a processor 240, a memory 250, and a battery 260. The Bluetooth transceiver 220 and the WiFi transceiver 230 may be optional depending on device capabilities, network availabilities and/or user preferences. The battery 260 may also be optional depending on device capabilities, network availabilities and/or user preferences.

The BNC/FSC transceiver 210 may comprise suitable logic, circuitry, interfaces and/or code that may allow the BNC/FSC enabled device 200 and other BNC capable devices to perform communication according to a BNC protocol. The BNC/FSC transceiver 210 may operate in a reader/writer mode (active mode), a card emulation mode (passive mode), or a peer-to-peer mode. In active mode, the BNC/FSC transceiver 210 may act like contactless cards. In this regard, the BNC/FSC transceiver 210 may enable the BNC/FSC enabled device 200 being used for payment. In passive mode, the BNC/FSC transceiver 210 may enable interacting with RF tags. For example, the BNC/FSC transceiver 210 may enable the BNC/FSC enabled device 200 used to read 'Smart Posters' (writer RF tags) to see whatever information has been included. In peer-to-peer mode, the BNC/FSC transceiver 210 may be operable to communicate with another BNC capable devices. For example, the BNC/FSC transceiver 210 may enable the BNC/FSC enabled device 200 to communicate information with other BNC/FSC enabled devices 110(*a*)-110(*d*) or a charging pad, such as the BNC charging pad 130, for example. In an exemplary embodiment of the invention, the BNC/FSC transceiver 210 may utilize a dedicated RF front-end circuitry for data transmission and reception using BNC. In another exemplary embodiment of the invention, the BNC/FSC transceiver 210 may share a RF front-end circuitry with other technology-based transceivers such as the Bluetooth transceiver 220 and the WiFi transceiver 230, for example. In yet another exemplary embodiment of the invention, the BNC/FSC transceiver 210 may be configured to communicate signals or data in BNC utilizing Full Spectrum Capture. In this regard, the BNC/FSC transceiver 210 may be allowed to capture or utilize the entire spectrum band for data or signal transmission and reception. For transmission, the BNC/FSC transceiver 210 may be instructed or signaled to utilize a single channel within the spectrum band. For reception, the BNC 210 may be configured to utilize one or more channels within the entire spectrum band.

The Bluetooth transceiver 220 may comprise suitable logic, circuitry, interfaces and/or code that may be operable to communicate Bluetooth radio signals over the Bluetooth network 124. In an exemplary embodiment of the invention, the Bluetooth transceiver 220 may be on continuously when needed and may utilize more power than would be utilized with Full Spectrum Capture. The Bluetooth transceiver 220 may be enabled to support coexistence operations so as to receive Bluetooth signals while utilizing Full Spectrum Capture in the BNC/FSC enabled device 200. In an exemplary embodiment of the invention, the Bluetooth transceiver 220 may utilize a dedicated RF front-end circuitry for data transmission and reception using Bluetooth. In another exemplary embodiment of the invention, the Bluetooth transceiver 220 may share a RF front-end circuitry with the BNC/FSC transceiver 210 for data transmission and reception using Bluetooth. In an exemplary embodiment of the invention, in some instances, the Bluetooth transceiver 220 may be securely paired with other Bluetooth and BNC capable devices utilizing BNC. In this regard, the BNC/FSC transceiver 210 may be enabled to exchange authentication information over an BNC link for pairing the Bluetooth transceiver 220 with other Bluetooth and BNC capable devices.

The WiFi transceiver 230 may comprise suitable logic, circuitry, interfaces and/or code that may be operable to communicate WiFi radio signals over the WiFi network 126. In an exemplary embodiment of the invention, the WiFi transceiver 230 may be on continuously when needed and may utilize more power than Full Spectrum Capture. The WiFi transceiver 230 may be enabled to support coexistence operations so as to receive WiFi signals while utilizing Full Spectrum Capture in the BNC/FSC enabled device 200. In an exemplary embodiment of the invention, the WiFi transceiver 230 may utilize a dedicated RF front-end circuitry for data transmission and reception using WiFi. In another exemplary embodiment of the invention, the WiFi transceiver 230 may share a RF front-end circuitry with the BNC/FSC transceiver 210 for data transmission and receiving using WiFi.

The processor 240 may comprise suitable logic, circuitry, interfaces and/or code that may be enabled to perform a variety of signal processing tasks such as, for example, channel selection or filtering, digital scaling, rate conversion, carrier/time synchronization/recovery, equalization/demapping, and/or channel decoding. The processor 240 may support various modem operations such as OFDM and CDMA operations, for example. The processor 240 may be operable to coordinate and control operations of the BNC/FSC transceiver 210, the Bluetooth transceiver 220, and the WiFi transceiver 230 to communicate corresponding radio signals while utilizing Full Spectrum Capture. For example, the processor 240 may manage, activate or deactivate the BNC/FSC transceiver 210 according to received Bluetooth signals via the Bluetooth transceiver 220. The processor 240 may also be operable to synchronize the operation of the BNC/FSC transceiver 210 and the Bluetooth transceiver 220, for example, so as to reduce time delay for accurately determining the location of an object of interest. In an exemplary embodiment of the invention, the processor 240 may be operable to manage data transmission as well as data reception. For transmission, the processor 240 may be operable to select or utilize a single channel within the operation spectrum band for data transmission. For reception, the processor 240 may be operable to utilize multiple reference elements or signals such as pilot signals to determine or detect which of channels in the operation spectrum band may be indeed usable. The processor 240 may also be operable to aggregate the usable channels to increase channel bandwidth for the data transmission.

In various exemplary embodiments of the invention, the processor 240 may enable configuration of the BNC/FSC enabled device 200 to operate in different communication environments. In this regard, for example, power, distance and bandwidth may be configured in order to stay within the FCC masks and limits and at the same time, provide optimal performance across the entire bandwidth.

For FCC requirements, power may be measured in a 120 KHz spectrum bandwidth. To determine how much power could be transmitted, the bandwidth available has to be determined. Once the bandwidth is determined, that value may be divided by 120 KHz and the results multiplied by the power that may be transmitted. For example, within the broadcast television frequency band, spurious radiation within a 120 kHz bandwidth must result in a field strength of 200 microvolts per meter or less, measured at a distance of 3 meters from an isotropic radiator. This field strength equates to a transmitted power of 0.01 microwatts (−50 dBm) of power radiating isotropically. If a bandwidth much larger than 120 kHz is utilized, the FCC requirements imply that much more power may be transmitted without transgressing limits on spurious emissions. For example, if a devices transmits its power over a 100 MHz bandwidth, then dividing this 100 MHz bandwidth by the measurement bandwidth of 120 KHz results in a 29 dB increase in allowable spurious emission levels. In order to stay well within the FCC limitations for spurious emissions, a device may be designed to transmit −50 dBm spread over a full gigahertz (GHz) of bandwidth, which is 39 dB below the FCC spurious radiation power spectral density limitations. With such a conservative estimate, the FCC may not possibly complain and consumer product manufacturers may have no issues or have any questions about whether the product may pass the FCC regulation.

Although −50 dBm may seem like very little power, using full spectrum capture may enable a wealth of applications. At this power level, several bits per second per hertz may be reliably conveyed across a distance of about 10 cm, equating to several gigabits per second of capacity if the entire television spectrum up to 1 GHz is employed. If the −50 dBm transmitted power is spread over a subset of the television spectrum (e.g. 200 to 600 MHz), there is a low likelihood of interference with any device 3 meters or farther away.

When broadband near-field communication is employed at a distance less than a wavelength, then attenuation improves nonlinearly as distance decreases linearly.

The processor 240 may establish a high data rate communication link utilizing BNC which transmits power levels 30 dB or more below spurious emission levels permitted by FCC, while maintaining a link budget with sufficient margin to address a variety of use cases, trading off data rate for transmission distance or barrier penetrating capabilities. One method of implementing this tradeoff is to use spread spectrum techniques to achieve spreading gain in exchange for throughput, such as is employed in CDMA systems. With a 30 dB margin, signals may, for example, be communicated through a typical non-load-bearing concrete wall.

In an exemplary embodiment of the invention, the processor 240 may enable the use of a channel or spectrum map to dynamically track in real-time, what frequencies in the channel band are usable. For example, the environment may be sensed and a channel map may be generated to identify TV, Bluetooth, WiMax, and 802.11 channels and the status of the identified channels noted. The channels that are not currently usable, for example above a certain noise threshold, will be avoided. The channel map is dynamically updated. In an exemplary embodiment of the invention, a broadband OFDM receiver may be utilized to capture the entire band and selectively begin to transmit on those channels that are deemed suitable (e.g., based on the channel map) for transmission. Since the two devices (Tx and Rx) are relatively close to each other, it may be safe to assume that both devices (Tx and Rx) are experiencing similar RF related conditions. In this regard, the transmitter may transmit without coordination of frequencies between the two devices. In one exemplary embodiment of the invention, a pool of backup channels may be maintained and as soon as a current channel degrades, a switch may be made to utilize the backup channels. Channels may be allocated from the pool of backup channels and de-allocated and placed back in the pool as needed. In an exemplary embodiment of the invention, in instances where the BNC/FSC enabled device 200 may coexist with an 802.11 device, the BNC/FSC enabled device 200 may be operable to sense the channel and transmit only on channels that are determined to be clear. The channel map may be continuously updated to ensure that the status of each of the channels is up-to-date. A weighting may also be applied to the channel.

In one exemplary embodiment of the invention, a plurality of users, each with their own spreading code, may concurrently transmit over a large bandwidth without any blocking. A receiver may capture the entire bandwidth and based on security settings, may select and listen to only those authorized user signals that may be of interest.

In one exemplary embodiment of the invention, the processor 240 may enable a broadcast feature based distance. For example, the characteristics of a room such as the size and openness may be sensed and the power, data rate, and range for the BNC/FSC enabled device 200 may be adjusted to conform with the sensed characteristics. The BNC/FSC enabled device 200 may be configured to communicate based on some threshold distance that is sensed. In some instances, it may be desirable for all conference participants in a conference room to receive information for a presentation. In this regard, the presenter does not care who receives a broadcast signal of the presentation so long as they are within a certain range, in this case, in the room. For example, all the conference participants may be within a perimeter of 15 feet. The broadcast is therefore controlled so that the content for the presentation is broadcasted to the conference participants within the conference room. In addition, beamforming and MIMO may be employed to determine the characteristics and to optimize communication amongst the devices.

In one exemplary embodiment of the invention, the processor 240 may provide or enable security by turning down the transmit power of the BNC/FSC enabled device 200 in order to minimize eavesdropping. In such instances, the containment of the power enables only devices within a certain range to receive signals and devices that are outside that range will not be able to receive signals. A lookup table (LUT), for example, comprising power and distance or range data may be utilized by the processor 240 or other device within the BNC/FSC enabled device 200 to control this security feature.

In another exemplary embodiment of the invention, the processor 240 may provide or enable security by ensuring that the processing time is less than the round trip delay in order to prevent spoofing. In this regard, the processor 240 or other device within the BNC/FSC enabled device 200 may be operable to determine the round trip delay. If the determined round trip delay is less than or equal to a certain value or threshold, communication may be permitted. However, in instances where the round trip delay may be greater than a particular value or threshold, communication may be blocked since this may be an indication that spoofing may have occurred.

In an exemplary embodiment of the invention, a conference presenter may walk into a conference room and provide information such as the size of the room and the number of participants, for example. This information may be utilized by the processor 240 to control the power and range that may be utilized to configure the BNC/FSC transceiver for use during the conference or other group presentations. In this manner, device screens and files, for example, may be shared amongst conference or group participant devices.

In another exemplary aspect of the invention, a map of conference attendees in the room may be presented and the conference may manually authorize each attendee to receive BNC/FSC presented information.

In various exemplary embodiments of the invention, the processor 240 may enable sharing of a screen for a cell phone or other communication device with other people in a room. While applications such as WebEx are tied to the Web, various exemplary embodiments of the instant invention comprise ad-hoc sharing of content, and control and manipulation of content displayed on a screen. In this regard, there is no need for a sophisticated backend server to facilitate the Web sharing service.

In an exemplary embodiment of the invention, a conference presenter may utilize BNC/FSC to share the information displayed on their tablet or cell phone screen with all team members in a conference room, either directly or in a daisy-chain manner. In this regard, the content displayed on the presenter's desktop on the cell phone or a tablet will be displayed on the screens of team members in an ad-hoc manner.

In an exemplary embodiment of the invention, a user may decide to take a picture and instead of showing it to a friend and emailing or texting the picture to that friend, the user may decide to share the screen that displays the picture content. Unlike Webex or other screen sharing methods, the processor 240 may enable sharing of the screens on a smartphone or tablet without using the 3G network or Internet. Additionally, no wires need to be connected for sharing of content among devices.

In an exemplary embodiment of the invention, the processor 240 may manage content for the BNC/FSC enabled device 200 such that the content may be layered, and when a user is within certain proximity of another BNC/FSC enabled device, the display may be shared without the need for any security. Both devices may concurrently display the same content. A profile may be utilized to determine what is to be shared and with whom it should be shared and when. A profile may also indicate other criteria such as, for example, time of day and location where sharing of the screen is permissible. Once the profile or some default settings are established, then the sharing of the display may occur automatically without user intervention.

Since the BNC/FSC enabled device 200 may be a Location Aware and Context Aware device, the processor 240 may be configured to determine whether the environment is a friendly one and if so, no security may be utilized. On the other hand, if it determined that the environment is unfriendly, then security may be required before screens are shared. If the user is with family or friends, then the screen may be shared without security with devices that are within a certain range. For devices outside of that range, then security is required to share the screen. A secure sharing session may be initiated with any device with the proper security keys (public keys and private keys) or procedures in place. A user may initiate sharing of their screen with all devices within 10 feet without security. This may occur since there is enough bandwidth to resolve the distance to within a foot or less. The distance may be extended if the user thinks that only trusted devices will be within that extended range. In some instances, the user may only allow a certain number of devices to share the screen. Once that number is reached, then no more connections or sharing sessions are permitted. If another device attempts to view the displayed screen, then that attempt is denied. This may be referred to as proximity sharing. With proximity sharing, the processor 240 may or may not place restriction on whether the screen or file may be copied and/or edited. For example, in instances where a file of a memo is being shared, group editing may be enabled for some or all the members in the group. Members in the group may be given control of the document at different times to enable editing. This may also be utilized on a social environment. For example, one user may draw on their device screen and the drawing on that screen is shared among friends in the room. The friends may interact with the drawing and may edit the document so it becomes a conversational piece.

In addition to sharing screens, videos, presentations, the processor 240 may allow that files may also be shared in an ad-hoc manner without the need to use the WWAN cellular network or a WiFi network, thereby eliminating the need to utilize and cause congestion on these networks. The cellular service providers may embrace this since it may offload traffic from their networks. This autonomous sharing requires no configuration on the part of the users.

The memory 250 may comprise suitable logic, circuitry, interfaces and/or code that may enable storage of data and/or other information utilized by the processor 240. For example, the memory 250 may be utilized to store information such as, for example, available operation spectrum bands that the BNC/FSC enabled device 200 may operate, and channels in the available operation spectrum bands. The memory 250 may be enabled to store executable instructions to manage or configure the BNC/FSC transceiver 210, the Bluetooth transceiver 220, and/or the WiFi transceiver 230 for desired behavior. The memory 250 may comprise RAM, ROM, low latency nonvolatile memory such as flash memory and/or other suitable electronic data storage capable of storing data and instructions.

The battery 260 may comprise suitable logic, circuitry, interfaces and/or code that may enable storage of power sufficient to facilitate the operation of all or some of the components of the BNC/FSC enabled device 200, such as the BNC/FSC transceiver 210, Bluetooth transceiver 220, WiFi transceiver 230, processor 240, and/or memory 250. The battery 260 may comprise Nickel Cadmium (NiCd), Nickel-Metal Hydride (NiMH), Lead Acid, Lithium Ion (Li-ion), Lithium Ion Polymer (Li-ion polymer) battery or other suitable power storage capable of supplying power.

In operation, the processor 240 may manage and control operation of device components such as the BNC/FSC transceiver 210 and the Bluetooth transceiver 220 to communicate corresponding radio signals for applications of interest. Transceivers such as the BNC/FSC transceiver 210 may be enabled to utilize Full Spectrum Capture for data communication to support the applications of interest. For example, a transceiver such as the BNC/FSC transceiver 210 may be enabled to digitize the entire operation spectrum band, 1 GHz, for example, for instant access to channels anywhere in the operation spectrum band. In this regard, the use of Full Spectrum Capture may enable the BNC/FSC transceiver 210 with total bandwidth deployment flexibility. For example, transceivers such as the BNC/FSC transceiver 210 may be tuned to an entirely different frequency in the operation spectrum band without constraint. In particular, previously unusable frequencies in the operation spectrum band may now be applied for additional broadband services. Additionally, the BNC/FSC transceiver 210 may be tuned to either broadband or broadcast services, and the channel allocation may be changed over time allowing operators to seamlessly transition services from broadcast to IP.

Figure 3:
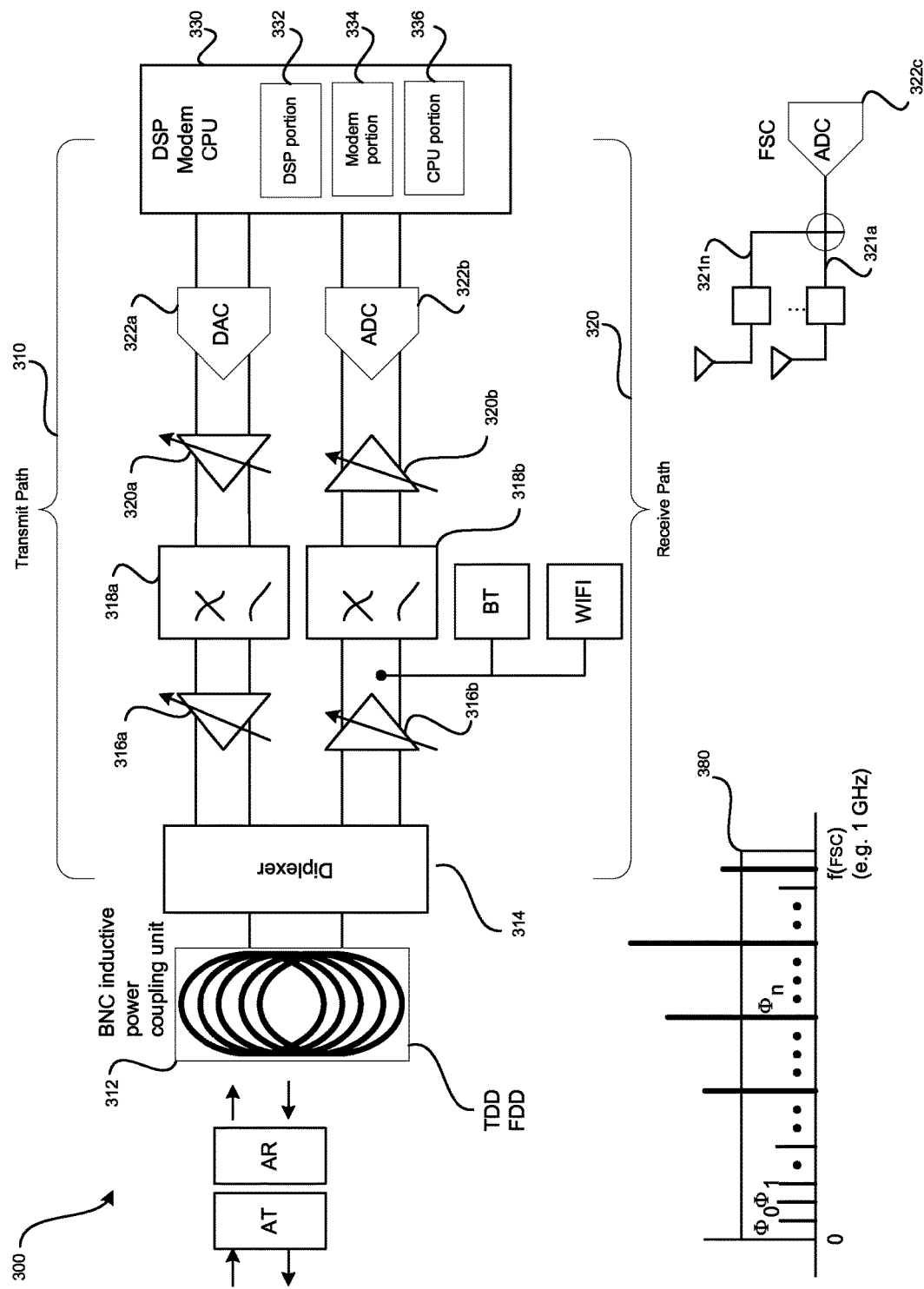
FIG. 3 is a block diagram that illustrates an exemplary controller, such as a Broadband Near Field Communication (BNC) controller for example, utilizing full spectrum capture (FSC), in accordance with an exemplary embodiment of the invention.

FIG. 3 is a block diagram that illustrates an exemplary controller, such as a Broadband Near Field Communication (BNC) controller for example, utilizing full spectrum capture (FSC), in accordance with an exemplary embodiment of the invention. Referring to FIG. 3, there is shown a BNC/FSC controller 300. The BNC/FSC controller 300 may comprise a transmit path 310 and a receive path 320, which share a DSP/modem/CPU unit 330. A BNC power inductive coupling unit 312 is coupled to a diplexer 314 such that the BNC power inductive coupling unit 312 may be shared by the transmit path 310 and the receive path 320 for data transmission and data receiving, respectively, over channels, $\phi_1, \ldots, \phi_n$, within a full spectrum band 380. In addition, the transmit path 310 may comprise variable gain amplifiers 316a and 320a, a transmit filter 318a, and a DAC 322a. The receive path 320 may comprise variable gain amplifiers 316b and 320b, a receive filter 318b, and an ADC 322b.

In an exemplary operation, the BNC power inductive coupling unit 312 may comprise suitable logic, circuitry, interfaces and/or code that may be utilized as an antenna for wireless communication operations for signal transmission and reception through the transmit path 310 and the receive path 320, respectively. The BNC power inductive coupling unit 312 may comprise a single Broadband Near-Field inductive coupling device such as a coil or an antenna or an antenna coil, for example and/or a capacitive coupling device. In some instances, the single coil may be utilized for wireless communication operations that are based on time-division duplexing (TDD) and/or frequency-division duplexing (FDD). In addition to being utilized as an antenna for wireless communication operations, the single coil may be utilized for receiving charge from a charging pad, such as the BNC charging pad 901 depicted in and described with respect to FIGS. 9, 10 and 11, for example, to power or operate at least a portion of the device that comprises the various components shown in FIG. 3 for example. The coil may be communicatively coupled to circuitry (not shown) that may be utilized to manage and/or store the received charge.

In an exemplary embodiment of the invention, the coil of the BNC power inductive coupling unit 312 may comprise a plurality of coil turns. In this regard, the number of coil turns that correspond to the receive path 320 may be larger than the number of coil turns that correspond to the transmit path 310 so as to obtain a low transmit gain and high receive gain operation.

In an exemplary embodiment of the invention, the BNC power inductive coupling unit 312 may also be equalized as part of Full Spectrum Capture, when used as an antenna. Unlike narrowband systems in which the signals are narrowband compared to the characteristics of the antenna, the antenna in Full Spectrum Capture may typically not be optimized for the application. Since the operation for Full Spectrum Capture may be at lower frequencies and at low powers than other wireless technologies, it may be possible to utilize antennas with poor characteristics by equalizing the power provided to the antenna. In this manner, the power from the antenna may be maximized without violating any Federal Communications Commission (FCC) constraints. A sensor may be implemented to detect or sense the impedance of the antenna across a range of frequencies. The output from the sensor may be provided as feedback for digital processing to enable sub-carrier equalization in order to obtain an optimal power transfer out of the antenna. For example, at frequencies where the antenna performance is poor (e.g., 10% efficiency), the power may be increased to overcome the inefficiencies. Since only a few frequencies may require additional power to compensate for the inefficiencies, the overall power transmitted may still be within FCC requirements. For example, power for certain frequencies may be increased by as much as 30 dB while the overall power transmitted remains within FCC requirements. In some instances, there may be a correspondence between the frequencies at which the transmit antenna has poor performance and the frequencies at which the receive antenna has poor performance. This correspondence may be utilized for purposes of antenna equalization. Antenna equalization may comprise over-compensation and/or under-compensation at one or more frequencies based on the characteristics of the transmit antenna and/or the receive antenna.

In order to combine the phase carriers, equalization may need to be performed. To utilize equalization, there may be known pilot symbol patterns, which may be scattered throughout the portion of the spectrum being considered. The pilot symbols may be at a known phase and are not randomized nor modulated by a data stream. The whole channel may be equalized based on these pilot symbols, which enables phase recovery. By utilizing pilot symbols, OFDM or WCDMA techniques may be supported for the modem portion described above. In broadcast, OFDM techniques may be utilized in which pilot symbols or pilot tones may be picked up, the pilot symbols or pilot tones being fixed or scattered and rotated over time. WiFi on the other hand, may utilize preambles and/or pilot symbols to enable synchronization.

In an exemplary embodiment of the invention, high receive gain may also be achieved by aiming the antenna in a particular direction. For Full Spectrum Capture in personal area networks, for example, omni-directional antennas for both transmit and receive operations may be more suitable than asymmetric antennas. On the other hand, for communicating or penetrating across a wall for indoor dwelling or other like barrier, an asymmetric antenna configuration may be more suitable for Full Spectrum Capture since it may be preferable to receive in one direction and not the other.

The transmission characteristics of a remote antenna or coil may be represented and/or modeled by the block labeled area of transmission (AT), while the reception characteristics of a local antenna or coil may be represented and/or modeled by the block labeled area of receiving (AR). In an exemplary embodiment of the invention, the remote antenna may also have reception characteristics and the local antenna may also have transmission characteristics.

In one exemplary embodiment of the invention, synchronization may occur by utilizing a standard frequency pattern for the antenna when a lower coding rate with more coding protection is being utilized. Once two devices are synchronized, the devices may start a negotiation to optimize the channel. For example, each device may provide antenna performance information and/or channel conditions information to the other device based on an information conveyance protocol. By utilizing the protocol information, impedance sensing, and signal processing, the channel conditions may be identified and considered when determining the transmit power distribution across antenna frequencies. In this regard, the devices may be operable to perform signal processing algorithms that allow the devices to dynamically determine local and remote antenna characteristics, and/or channel conditions or impairments, including the presence of blockers or interferers, for example. A tracking scheme may be implemented for exchanging channel and/or antenna characteristics, which may include a preamble, a pattern field, and/or decoding rate information. These operations may be performed at the PHY and/or MAC layers, for example, through the DSP/Modem/CPU unit 330.

Some of the techniques described above may be applied to overcome the poor performance that some antennas may have over a wide spectrum. The wide spectrum requirements of Full Spectrum Capture are such that the ratio of the lower frequencies to the higher frequencies is higher than a similar ratio for ultra-wideband (UWB), for example. As a result, antenna characteristics over the wide spectrum of Full Spectrum Capture operation may be continuously monitored and considered where such operations may not be needed for UWB.

In an exemplary embodiment of the invention, other wireless technologies, for example, ZigBee, Bluetooth, WLAN, and WiMax, may be supported in addition to Full Spectrum Capture. In this regard, a separate and/or better antenna may be needed to support TDD for Bluetooth, for example, at least on the receive path 320. The transmit path 310 may be a reverse implementation of the receive path 320. In ZigBee, Bluetooth, WLAN, and WiMax, there may be mixing and filtering operations at the front end that allows the signal path to have a narrower band than Full Spectrum Capture, which in turn may benefit from a dedicated antenna.

In an exemplary embodiment of the invention, other wireless technologies such as, for example, ZigBee, Bluetooth, WLAN, and WiMax may coexist with Full Spectrum Capture in the same BNC/FSC enabled device 200. In this regard, coexistence operations may be supported. Two or more receive antennas may be utilized, each of which receives signals from different wireless technologies such as, for example, ZigBee, Bluetooth, WLAN, and WiMax. Each of the received signals may be processed or filtered before they are all combined and digitally converted for Full Spectrum Capture operations. In addition, utilizing device components such as the ADC 322b and/or the DAC 322a, which require less power, may enable multimode devices. In an exemplary embodiment of the invention, multimode devices such as the BNC/FSC enabled device 200 may utilize Full Spectrum Capture as a single radio to support multiple modes or as a universal interface by having one or more of the analog components, such as the filters, for example, be band-selectable or tunable. The data converter may still run at the appropriate rate to enable handling of the filtered data. In this regard, the Full Spectrum Capture may be utilized for Bluetooth, IEEE 802.11, and/or WiFi communications.

In some embodiments of the invention, a delta-sigma bandpass converter may be utilized in connection with the ADC 322b such that the sampling may have a transfer function that peaks at a certain frequency and drops off at other frequencies. By having a converter that has a bandpass transfer function and not a low-pass transfer function it may be possible to modify the ADC 322b and perform conversion operations utilizing less power.

Operating Full Spectrum Capture at higher frequencies, such as 5 GHz or 10 GHz, for example, based on an efficient ADC and/or DAC, may support capture or reception of IEEE 802.11 signals. The filtering and processing may be performed digitally. In some instances, the front-end of the Full Spectrum Capture may be made coarsely tunable to be able to remove, in the analog domain, certain frequencies, bands, and/or unwanted intermediate data. Such an approach may provide an improvement in dynamic range. Digital signal processing may then be utilized for any further filtering operations that may be needed.

In an exemplary embodiment of the invention, the Full Spectrum Capture may be implemented without mixers. In this regard, the data pipe may remain large until the data becomes digital. In addition, not having mixers in Full Spectrum Capture may remove additional components in the transmit path 310 and the receive path 320 that may result in a lowered dynamic range. Distortion and/or noise performance may also be improved since mixers are not included in the transmit path 310 and the receive path 320.

The diplexer 314 may comprise suitable logic, circuitry, interfaces and/or code that may be operable to reduce the likelihood that signal transmission may saturate the receive path 320. The diplexer 314, however, may not be needed when very low power levels are utilized over a wide bandwidth, as may occur during Full Spectrum Capture operations. In such instances, transmission and reception of signals may occur concurrently without having signal transmission interfere with signal reception. In some embodiments of the invention, a switch may be utilized instead of the diplexer 314 to switch between transmission and reception in TDD communications.

The transmit filter 318a and the receive filter 318b may comprise suitable logic, circuitry, interfaces and/or code that may be operable to provide or perform spectral filtering to support Full Spectrum Capture operations. In this regard, the transmit filter 318a and the receive filter 318b may be utilized to filter frequencies outside the Full Spectrum Capture frequency range. In some instances, the characteristics of the antenna (e.g., coil) may be such that it may perform filtering functions and, in those instances, transmit and/or receive filters may not be needed.

The DAC 322a and the ADC 322b may comprise suitable logic, circuitry, interfaces and/or code that may be operable to perform Digital to Analog data generation or conversion and Analog to Digital data collections, respectively. In an exemplary embodiment of the invention, the DAC 322a and the ADC 322b may be operable to perform high speed digital-to-analog and analog-to-digital conversion, respectively. In this regard, the DAC 322a and the ADC 322b may be operable at very high speeds to enable Full Spectrum Capture. The digital signals produced by the ADC 322b and received by the DAC 322a may be referred to as digital baseband signals. The DAC 322a and the ADC 322b may be communicatively coupled to the DSP/modem/CPU unit 330.

The various variable gain amplifiers 316a and 320a, and 316b and 320b may comprise suitable logic, circuitry, code, and/or interfaces that may be operable to have the gain that may be applied by the variable gain amplifier 316a, for example, to an input signal be programmable or controlled. One or more of the variable gain amplifiers in the transmit path 310 may comprise power amplifiers, while one or more of the variable gain amplifiers in the receive path 320 may comprise low-noise amplifiers. The various variable gain amplifiers 316a and 320a, and 316b and 320b may be operable to handle low levels of power spread over a wide bandwidth to support Full Spectrum Capture operations.

The DSP/Modem/CPU unit 330 may comprise circuitry that may comprise a digital signal processor (DSP) portion 332, a modulator-demodulator (modem) portion 334, and/or a central processing unit (CPU) 336. The DSP portion 332 may comprise suitable logic, circuitry, code, and/or interfaces that may be operable to clean up signals. For example, the DSP portion 332 may be operable to perform channel selection and/or filtering, digital scaling, and/or rate conversion. The rate conversion or sample rate conversion may be performed utilizing variable rate interpolators. For example, a 13.5 Megahertz (MHz) signal that is received may be interpolated down to a 13.3 MHz signal during rate conversion operations.

The modem portion 334 may comprise suitable logic, circuitry, code, and/or interfaces that may be operable to perform synchronization, equalization and/or demapping, and/or channel encoding when processing received signals. The channel decoder may utilize a concatenated code such as an inner code and an outer code. An example of such a concatenated code may comprise a low-density parity-check (LDPC) code followed by a Bosex-Chaudhuri-Hocquenghem (BCH) code. The channel decoder may utilize a concatenated code that comprises a Viterbi code, for example. The modem portion 334 may also be operable to perform channel encoding and/or equalization, and/or mapping when processing signals for transmission. During transmission, synchronization is typically not needed. The operation of the modem portion 334 may be implemented using an orthogonal frequency-division multiplexing (OFDM) approach or an approach based on code division multiple access (CDMA).

The CPU portion 336 may comprise suitable logic, circuitry, code, and/or interfaces that may be operable to support MAC layer and/or Link layer operations for Full Spectrum Capture. The MAC layer may support the ability to share the medium, which utilizing Full Spectrum Capture allows the medium to be shared with fewer collision type issues. For example, when everyone is sending less than the full bandwidth (e.g., 1 GHz), the operation may be easier than if everyone is trying to send close to the full bandwidth, in which case some form of negotiation between devices may be supported by the MAC layer.

The MAC layer and the Link layer enable access sharing, which may use, for example, OFDM techniques, CDMA techniques, Direct Sequence Spread Spectrum (DSSS) techniques and/or any combination thereof, such as for example, a CDMA technique implemented on a OFDM system. For CDMA-like operations, low-power multiple phase carriers may be sent, such as 8 k, 10 k, 12 k, 32 k, or 64 k, for example. Each of the phase carriers may have a random phase. When the random phase is known, a scan or search may be performed for those known phase carriers. In some instances, there may be one or more preset channels for each search. Since the power utilized in Full Spectrum Capture is typically very low, the search or scan goes through each of the channels. If the different phase carriers are combined, it may be possible to obtain a significant coding or dispreading gain. OFDM techniques may provide, at least in some instances, an approach in which some of the sub-channels may be left out or left unused, especially when it is known that those channels may have some form of interference. For example, it may be preferable not to transmit in certain channels that are known to be dead and/or where it may be preferable to ignore information from a channel that has noise and is likely to degrade the performance of the combined signal.

In some embodiments of the invention, the spectral bandwidth corresponding to Full Spectrum Capture operations may extend to a frequency (e.g., $f_{FSC}$) of approximately 1 Gigahertz (GHz), for example. The Full Spectrum Capture spectral bandwidth may depend on the frequency of operation of the ADC 322*b* and/or of the DAC 322*a*. If the ADC 322*b* and/or the DAC 322*a* is operable to capture 10 GHz of bandwidth, for example, Full Spectrum Capture at or near 10 GHz may be performed.

In an exemplary embodiment of the invention, the BNC/FSC enabled device 200 may comprise one or more other receive paths 321*a*-321*n* in addition to the receive path 320 with Full Spectrum Capture. In this regard, the one or more other receive paths 321*a*-321*n* may comprise components for handling received signals via WiFi, WiMax, ZigBee, RFID, and/or Bluetooth. In an exemplary embodiment of the invention, when supporting additional wireless technologies, such as Bluetooth and/or WiFi, for example, a portion of the receive path 320 with Full Spectrum Capture may be coupled to the one or more other receive paths 321*a*-321*n*. In other words, the BNC/FSC enabled device 200 may be configured to utilize different RF front ends to support communication via additional wireless technologies. In an exemplary embodiment of the invention, the BNC/FSC enabled device 200 may be configured to utilize a single RF front end to handle communication via BNC/FSC, NFC, Wireless power, WiFi, WiMax, ZigBee, RFID, BNC and Bluetooth.

In one exemplary embodiment of the invention, a device such as the BNC/FSC enabled device 200 may support a processing path for Full Spectrum Capture and another processing path for narrowband communication. The device may be operable to switch between the two based on the operation of the BNC/FSC enabled device 200. Moreover, when switching to the narrowband communication processing path, the amount of power under consideration may drop from the amount of power being handled by the Full Spectrum Capture processing path. The narrowband communication processing path may share some components with the Full Spectrum Capture processing path such as low-noise amplifiers 316*a*, 316*b*, 320*a* and 320*b*.

Figure 4:
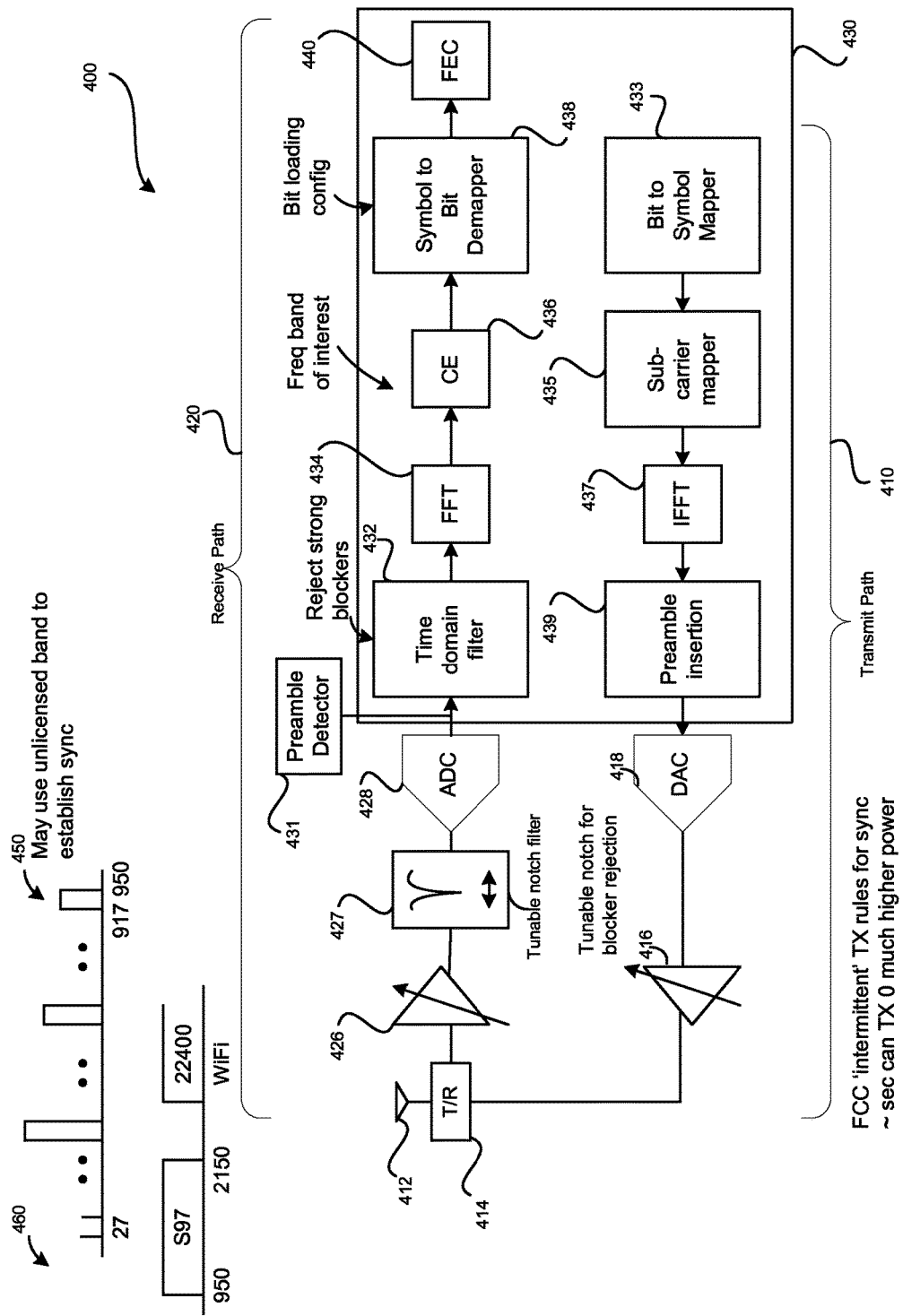
FIG. 4 is a block diagram that illustrates an exemplary implementation for a controller, such as a Broadband Near Field Communication (BNC) controller for example, that utilizes a tunable notch filter in a receive path with full spectrum capture (FSC), in accordance with an exemplary embodiment of the invention.

FIG. 4 is a block diagram that illustrates an exemplary implementation for a controller, such as a Broadband Near Field Communication (BNC) controller for example, that utilizes a tunable notch filter in a receive path with full spectrum capture (FSC), in accordance with an exemplary embodiment of the invention. Referring to FIG. 4, there is shown a hybrid BNC/FSC controller 400. The hybrid BNC/FSC controller 400 may comprise a transmit path 410, a receive path 420, and a DSP/Modem/CPU unit 430. In addition, the transmit path 410 may comprise a variable gain amplifier 416 and a DAC 418. The receive path 420 may comprise a variable gain amplifier 426, a tunable notch filter 427, and an ADC 428. The transmit path 410 and the receive path 420 may be coupled to the same antenna 412 through a transmit-receive (T/R) switch 414. In this regard, the variable gain amplifiers 416 in the transmit path 410 may be turned off during receive, and the variable gain amplifiers 426 in the receive path 420 may be turned off during transmit. The antenna 412, the variable gain amplifiers 416 and 426, the DAC 418 and the ADC 428 may be similar to the BNC power inductive coupling unit 312, the variable gain amplifiers 316*b*, 320*a*, the DAC 322*a*, and the ADC 322*b* of FIG. 3, respectively.

The T/R switch 414 may comprise suitable logic, circuitry, interfaces and/or code that may be operable to switch between transmit and receive. In some embodiments of the invention, the T/R switch 414 may be positioned or placed between the variable gain amplifier 426 and the tunable notch filter 427 in the receive path 420. In some instances, since the power being transmitted may be low enough, the T/R switch 414 may not be needed.

The tunable notch filter 427 may comprise suitable logic, circuitry, code, and/or interfaces that may be operable to reject a blocker or interference signal. The blockers may be strong and saturate the ADC 428. In this regard, the tunable notch filter 427 may be utilized to remove the strongest blocker. The tunable notch filter 427 may be implemented on-board or on-chip, for example. For high frequencies, the tunable notch filter 427 may be on-chip, and for low frequencies, it may be off-chip. While the tunable notch filter 427 may affect the frequencies that are adjacent to the frequency being removed, the Full Spectrum Capture spectrum overall may not be significantly affected because of the broadband nature of Full Spectrum Capture. Sensing circuitry may be utilized to detect the strong blockers and provide feedback to adjust the frequency of the tunable notch filter 427.

The receive path 420 may also comprise a preamble detector 431, a time-domain filter 432, a Fast Fourier Transform (FFT) block 434, a channel equalizer (CE) 436, a symbol to bit demapper 438, and/or a forward error correction (FEC) block 440. The preamble detector 431 may comprise suitable logic, circuitry, code, and/or interfaces that may be operable to detect OFDM symbols in time domain from time domain samples from the tunable notch filter 427. The time-domain filter 432 may comprise suitable logic, circuitry, code, and/or interfaces that may be operable to reject strong blocker signals. The FFT block 434 may comprise suitable logic, circuitry, interfaces and/or code that may be operable to perform Fast Fourier Transform (FFT) over OFDM symbols from the time domain filter 432. The FFT block 434 may be operable to convert time domain samples of the OFDM symbols to corresponding frequency domain samples for frequency domain channel equalization via the CE 436. The CE 436 may comprise suitable logic, circuitry, code, and/or interfaces that may be operable to provide channel equalization for frequency bands of interest utilizing frequency domain samples supplied from the FFT block 434. The symbol to bit demapper 438 may comprise suitable logic, circuitry, code, and/or interfaces that may be operable to perform bit-loading configuration.

The transmit path 410 may also comprise a bit to symbol mapper 433, a sub-carrier mapper 435, an Inverse Fast Fourier Transform (IFFT) block 437, and/or a preamble insertion block 439. The bit to symbol mapper 433 may comprise suitable logic, circuitry, code, and/or interfaces that may be operable to perform symbol-loading configuration. The sub-carrier mapper 435 may comprise suitable logic, circuitry, code, and/or interfaces that may be operable to map sub-carriers to avoid regulated frequencies. The avoidance of regulated frequencies may be binary or graduated. The IFFT block 437 may comprise suitable logic, circuitry, interfaces and/or code that may be operable to perform Inverse Fast Fourier Transform (IFFT) over frequency domain samples of OFDM symbols from the sub-carrier mapper 435. The IFFT block 437 may be operable to convert frequency domain samples of the OFDM symbols to corresponding time domain samples. The preamble insertion block 439 may comprise suitable logic, circuitry, code, and/or interfaces that may be operable to insert a preamble into time domain samples from the IFFT block 437 in a manner that deals with frequency avoidance.

Although OFDM-based implementation is illustrated for Full Spectrum Capture, the invention may not be so limited. Accordingly, other wireless technologies such as, for example, CDMA technology and WCDMA (spread spectrum approach) technology may also be utilized for Full Spectrum Capture without departing from the spirit and scope of various exemplary embodiments of the invention.

In an exemplary embodiment of the invention, on the receive path 420, the variable gain amplifier 426, as a LNA typically drives the very fast ADC 428 in order to achieve Full Spectrum Capture performance. The Full Spectrum Capture operations may be typically used with packet-based systems. In an exemplary embodiment of the invention, the Full Spectrum Capture operations may comprise having a MAC layer picking which frequency bands are to be used and coordinating that information with the device front-end. The MAC layer may also determine and/or coordinate bit loading, for example. In this regard, the MAC layer may determine which frequencies have good signal-to-noise ratio (SNR) and which ones do not, and may allocate more bits to the ones with good SNR than to those with lower SNR.

In an exemplary embodiment of the invention, on the transmit path 410, there may be frequency ranges in which the Full Spectrum Capture may not want to transmit. For example, the Full Spectrum Capture may be explicitly prohibited by regulatory rules from transmitting in certain frequencies. In another example, the BNC/FSC enabled device 200 may sense that a television channel is being used and may not want to transmit in that frequency. As described above, the avoidance of certain frequencies may be implemented in a binary or graduated fashion. For example, in a binary case, transmission at a certain frequency or note may be ON or OFF. For the graduated case, the power level of the transmitted signal may be based on how strong other signals are in that same frequency. For example, the power level may be stronger for transmission at the frequency of the television channel when the signal strength of the television channel is low, which may indicate that the signal is far away.

To start communication between two devices, a time reference may be established and there may be an agreement about which frequencies are to be utilized. In an exemplary embodiment of the invention, various ways in which synchronization may be supported may be utilized by the hybrid BNC/FSC controller 400. For example, the hybrid BNC/FSC controller 400 that supports Full Spectrum Capture may awake and look for preambles or beacons of some sort. This approach may consume a lot of power. In another example, both sides, that is, the two peer devices that are to communicate, look at one or more pulse per second (PPS) signals used in global positioning systems (GPS). When any one device wakes up, it may be realigned based on a PPS signal. In some instances, the PPS signal that may be utilized for synchronization is from another device that is nearby. This type of synchronization may occur even when there is a lot of drift and/or when there is some degree of inaccuracy with the PPS signal. In some embodiments of the invention, there may be an indication received or generated by the device of how accurate the PPS signal is in order to determine whether the PPS signal is suitable for synchronization.

In an exemplary embodiment of the invention, the hybrid BNC/FSC controller 400 may utilize unlicensed bands to establish synchronization. In this regard, synchronization information may also be provided in an unlicensed band, such as the cordless region 450, for example, between 917 MHz and 950 MHz. The hybrid BNC/FSC controller 400 may look into this region of the spectrum to find synchronization information. Similarly, frequencies down at around 27 MHz (e.g., frequencies for operation of garage door openers) 460 may be utilized by devices looking for synchronization information.

In some embodiments of the invention, the two peer devices looking to synchronize may operate based on an established agreement on time regarding how long to look for a neighbor to synchronize. Since synchronization may take some time at relatively large power levels, looking for a neighbor for a long period of time may result in power being drained from the searching device.

In an exemplary embodiment of the invention, preset OFDM symbols with randomized phases may be utilized in a correlation operation to enable synchronization with another device. With OFDM enabled, when a preamble is utilized, the preamble may typically cover the entire frequency band. The preamble may need to be changed to avoid certain frequencies as determined by regulatory rules and/or operating conditions. The preamble may then be implemented before the FFT block 434 in the receive path 420. Both sides may need to be aware of the preamble characteristics in order to enable communication between them.

In an exemplary embodiment of the invention, the Full Spectrum Capture may provide very short duty cycles for low power. In this regard, FCC intermittent burst allows for the transmission, at the packet level, of much higher power during short burst. The amount of power that is provided may be based on the frequency.

Figure 5:
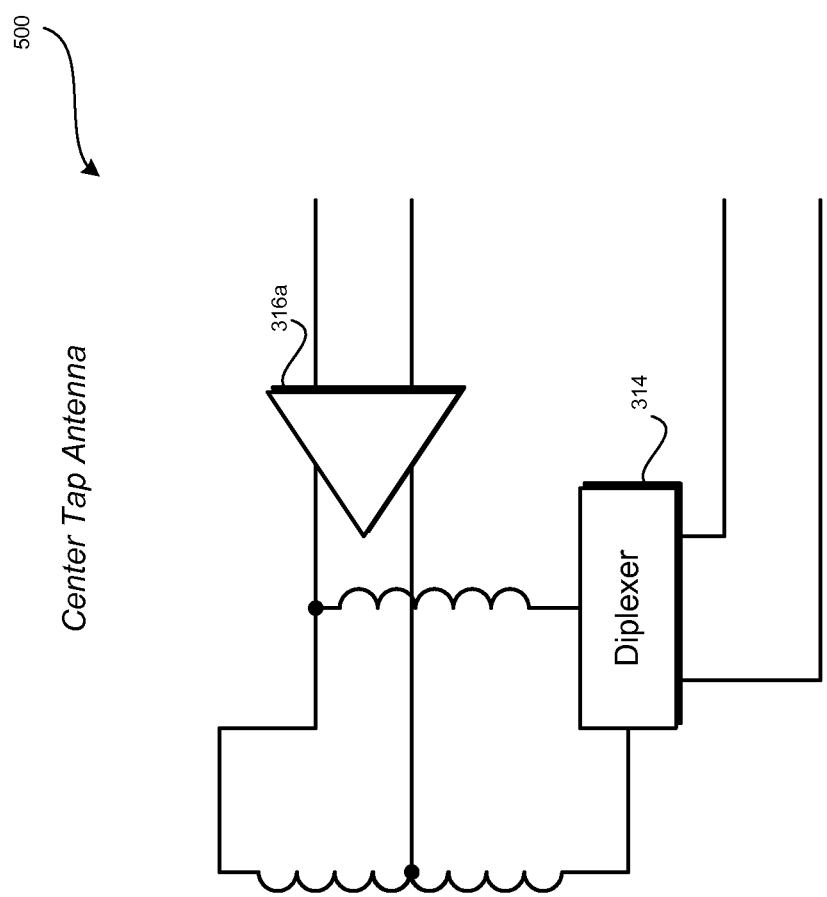
FIG. 5 is a block diagram that illustrates an exemplary center tap antenna that is utilized for full spectrum capture (FSC) in, for example, Broadband Near Field Communication (BNC), in accordance with an exemplary embodiment of the invention.

FIG. 5 is a block diagram that illustrates an exemplary center tap antenna that is utilized for full spectrum capture (FSC) in, for example, Broadband Near Field Communication (BNC), in accordance with an exemplary embodiment of the invention. Referring to FIG. 5, there is shown a center tap antenna 500. The center tap antenna 500 may be designed or implemented such that the impedance circuitry and the voltage circuitry may be directly coupled to the center tapping of the whole coil (antenna). The center tap antenna 500 may enable induction-based charging of a BNC/FSC enabled device, such as the BNC/FSC enabled device 200 and concurrent communication of the BNC/FSC enabled device 200 with an external device, such as the external device 903 for example.

In accordance with various exemplary embodiments of the invention, a BNC/FSC enabled device, such as the BNC/FSC enabled device 200 may be operable to share antennas and/or circuitry with wireless power devices, and with NFC devices. In other embodiments of the invention, the BNC/FSC enabled device, such as the BNC/FSC enabled device 200 may be operable to share antennas and/or circuitry with wireless power device and also with NFC devices.

Figure 6:
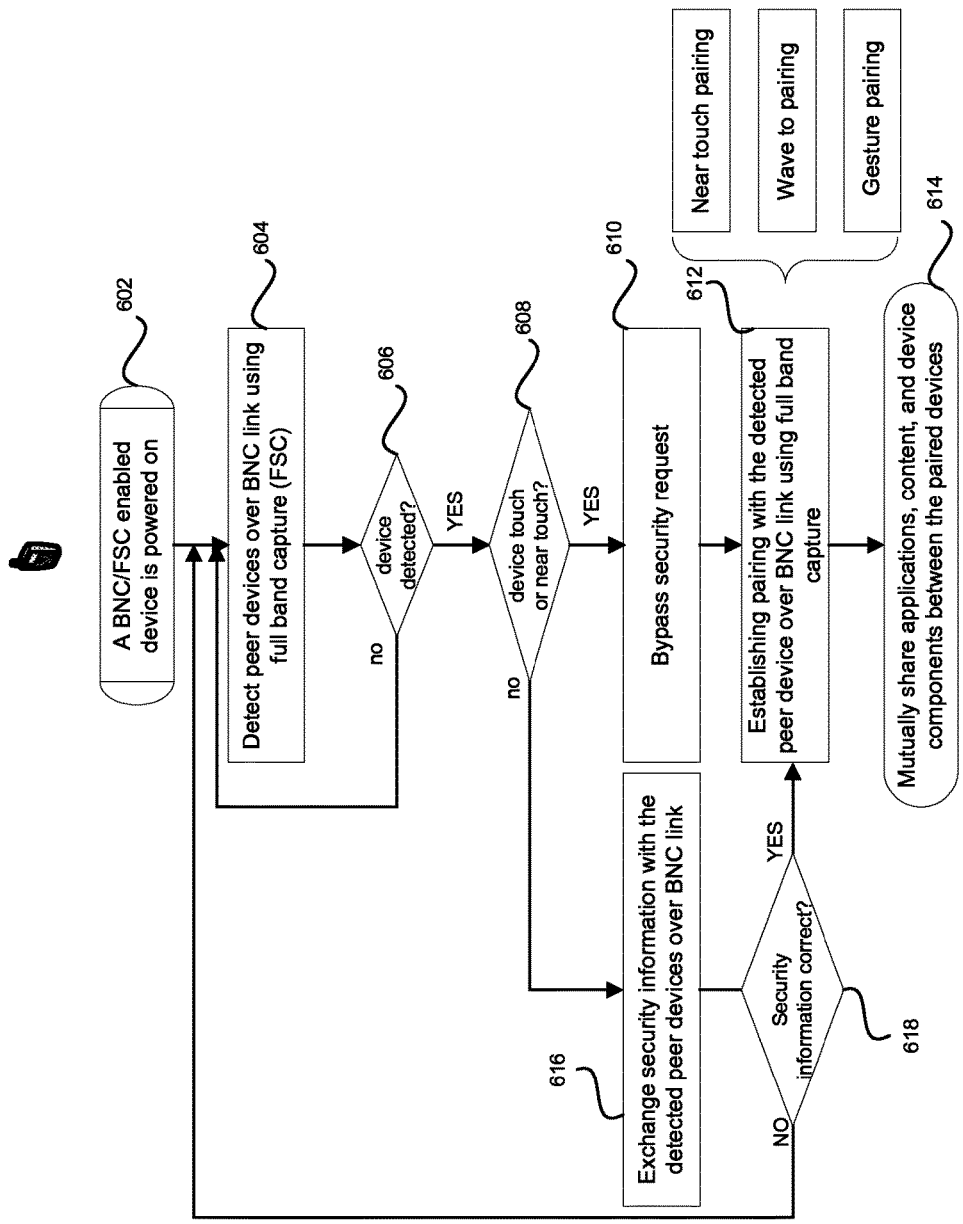
FIG. 6 is a flow diagram that illustrates exemplary steps for device pairing and security in, for example, Broadband Near Field Communication (BNC) utilizing full spectrum capture (FSC), in accordance with an exemplary embodiment of the invention.

FIG. 6 is a flow diagram that illustrates exemplary steps for device pairing and security in, for example, Broadband Near Field Communication (BNC) utilizing full spectrum capture (FSC), in accordance with an exemplary embodiment of the invention. Referring to FIG. 6, in step 602, a BNC/FSC enabled device such as the BNC/FSC enabled device 200 is powered on. The exemplary steps start in step 604, where the BNC/FSC enabled device 200 may be operable to detect peer devices over a BNC link utilizing Full Spectrum Capture. For example, the BNC/FSC enabled device 200 may monitor signals or messages received via the BNC power inductive coupling unit 312 for device-identifying reference information such as a MAC-ID, MSN or a peer address in the communication network, where the pairing takes place. In step 606, the BNC/FSC enabled device 200 may determine whether peer BNC/FSC enabled devices are detected over a BNC link. In instances where one or more peer BNC/FSC enabled devices are detected, then in step 608, the BNC/FSC enabled device 200 may determine whether it touches or nearly touches the detected peer BNC/FSC enabled devices. In instances where the BNC/FSC enabled device 200 touches or nearly touches the detected peer BNC/FSC enabled devices, then in step 610, the BNC/FSC enabled device 200 may bypass security request. In other words, the BNC/FSC enabled device 200 may not exchange or communicate security information with the detected peer BNC/FSC enabled devices. The security information may comprise user account names and logo, password, PIN number and other credentials, security categories, encryption keys, cryptographic keys, an authentication value and sequence number, signatures to be included, digital certificates, source IP address, destination IP address, and/or port numbers.

In step 612, the BNC/FSC enabled device 200 may be operable to establish pairing with each of the detected peer BNC/FSC enabled devices over BNC link using Full Spectrum Capture. The pairing may comprise near touch pairing, wave to pairing and gesture pairing. Touch or near touch pairing refers to pairing the BNC/FSC enabled device 200 with a peer BNC/FSC enabled device by simply touching or near touching the two BNC/FSC enabled devices to be paired or connected to the network. Touch or near touch pairing may be utilized to pair the BNC/FSC enabled device 200 with the BNC charging pad 1000. Wave to pair enables the pairing of two BNC/FSC enabled devices when they are within certain proximity of each other, for example, ¼ of a wavelength of each other. In this regard, one device may be waved next to the other within the distance of ¼ wavelength to accomplish pairing. In one exemplary embodiment of the invention, the waving may have to occur in a specific manner or pattern to effectively pair the two BNC/FSC enabled devices. If the waving is not done in that specific manner or pattern, then no pairing is done and the devices may not communicate with each other or will not communicate secure information with each other. This is done, for example, to avoid unintended pairings based simply on proximity in crowded environments. This signature for waving or waving in a particular pattern may be referred to as gesture or signature pairing. In this regard, the device would not only need to be within certain proximity, but also would need to be moved or waived in a pre-defined manner, during which the devices are brought into such proximity. The BNC/FSC enabled devices may take advantage of existing motion/directional devices, such as a gyroscope, for example, to capture a unique gesture or signature for each user, and only pair the communication device if that gesture or signature is detected during a proximity event.

In step 614, the BNC/FSC enabled device 200 may mutually share various types of data, such as, for example, applications, telephone numbers, pictures, multimedia content, files (e.g., MP3 files), digital authorizations and/or device components (e.g., a display) with the detected peer BNC/FSC enabled devices. In this regard, sharing, for example, of the display, multimedia content and/or files may occur among the BNC/FSC enabled device 200 and the detected peer BNC/FSC enabled devices regardless of who is receiving the display content. For example, a user of BNC/FSC enabled device 200 at a mall may take a picture and share the screen, which displays the picture, with all their friends who are standing there. In this regard, the user is not concerned whether someone is eavesdropping and is viewing the picture. The BNC/FSC enabled device 200 may be controlled so the signals are not communicated beyond a certain range.

In an exemplary embodiment of the invention, a secure communication session may be established for paired devices based on proximity. In this regard, devices may be excluded from the secure communication session if they are located outside that proximity.

In step 606, in instances where no peer BNC/FSC enabled device is detected, then the exemplary steps return to step 604.

In step 608, in instances where the BNC/FSC enabled device 200 does not touch or near touch the detected peer BNC/FSC enabled devices, then in step 616, where the BNC/FSC enabled device 200 may exchange security information with the detected peer devices over BNC link. In step 618, the BNC/FSC enabled device 200 may determine whether the security information from the detected peer devices is correct. In instances where the received security information is correct, then exemplary process continues in step 612. Otherwise the exemplary steps return to step 604.

Figure 7:
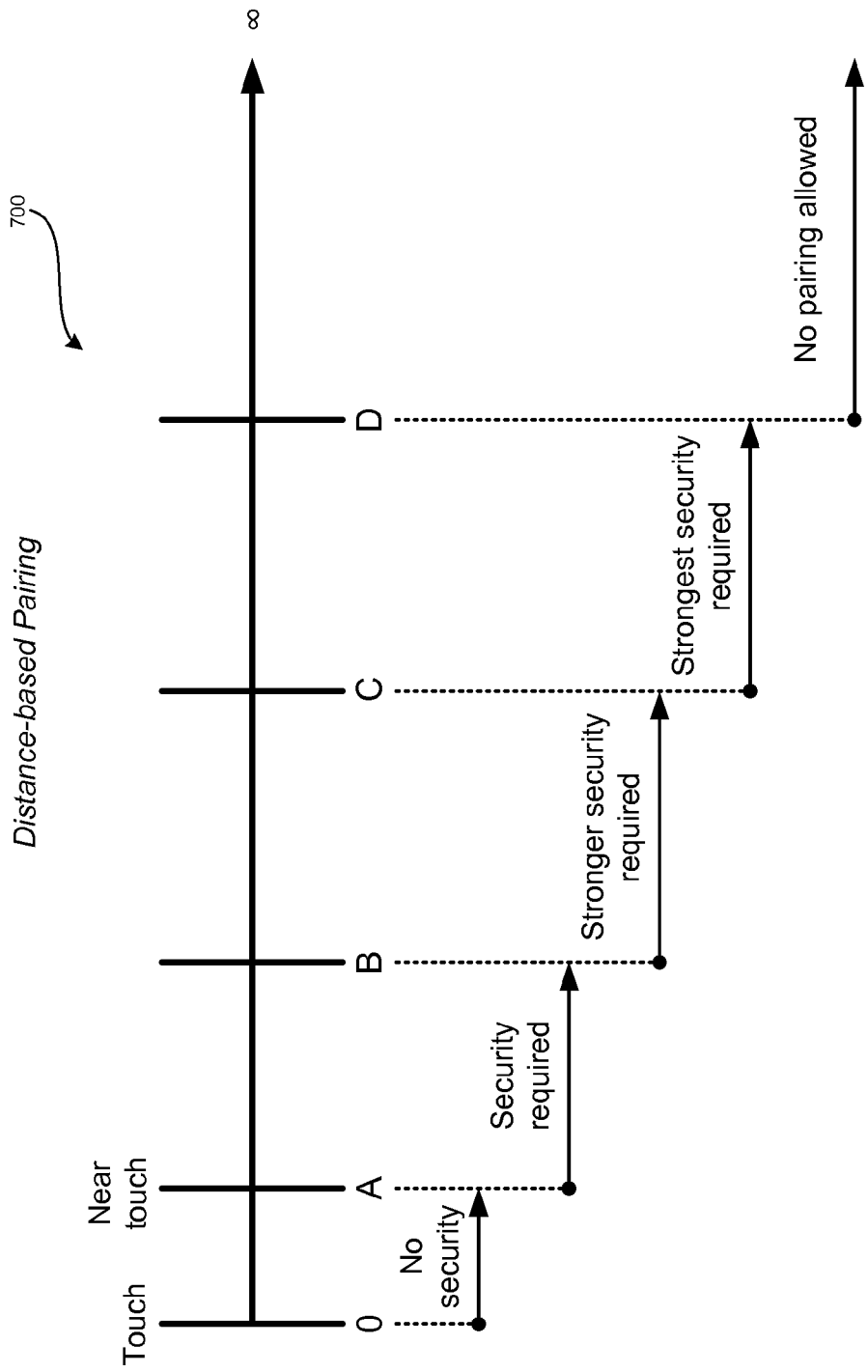
FIG. 7 a flow chart illustrating exemplary distance-based pairing of devices, such as BNC/FSC enabled devices for example, to provide a plurality of security levels, in accordance with an exemplary embodiment of the invention.

FIG. 7 a flow chart illustrating exemplary distance-based pairing of devices, such as BNC/FSC enabled devices for example, to provide a plurality of security levels, in accordance with an exemplary embodiment of the invention. Referring to FIG. 7, there is shown a distance-based pairing 700. In various exemplary embodiments of the invention, a sliding scale may be utilized for secured pairing. In other words a sliding scale of a plurality of security levels may be established based on the corresponding distances that he two BNC/FSC enabled devices are from each other. In this regard, the two BNC/FSC enabled devices that are to be paired may be placed very close to each other and their power may be controlled to the point where they may just hear each other and thus may not be heard by any other listening device. At that point, security information such as, for example, keys may be exchanged and the two devices paired using Full Spectrum Capture. In an exemplary embodiment of the invention, depending on distance between the two BNC/FSC enabled devices, different levels of security may be applied for pairing. In this regard, pairing may occur at varying distances. The closer together the two BNC/FSC enabled devices are, the lesser the security that is needed. On the other hand, the further apart two BNC/FSC enabled devices are, the greater the security that is needed for pairing. For example, if the two BNC/FSC enabled devices, between 0 and A, are touching or near touching, then no security request is needed. In other words, users of the two BNC/FSC enabled devices do not care whether the content is communicated without security, so long as the communication occurs and/or occurs within a certain range (between 0 and A). If the two BNC/FSC enabled devices, between A and B, are near touching, then a first security scheme may be utilized. If the two BNC/FSC enabled devices are between B and C, 5 cm apart, for example, a second security scheme may be utilized, where the second security scheme may be stronger than the first security scheme. If the two BNC/FSC enabled devices are between B and C, 20 cm apart, for example, a third security scheme may be utilized, where the third security scheme may be stronger than the second and the first security schemes. If the two BNC/FSC enabled devices are beyond D, greater than 100 cm, for example, no pairing may be allowed.

A security scheme may comprise data categories that may be communicated between the two BNC/FSC enabled devices. In an exemplary embodiment of the invention, the two BNC/FSC enabled devices may be operable to communicate secure data only when the two BNC/FSC enabled devices are located at a certain distance. For example, the two BNC/FSC enabled devices may only communicate data when they are located at one meter or less apart. If the two BNC/FSC enabled devices are located at a distance greater than one meter, they may communicate only non-secure data. If the two BNC/FSC enabled devices are located more than 2 meters apart, then they may not communicate at all. Those two BNC/FSC enabled devices may only know the channel between the two BNC/FSC enabled devices and both devices share the same spectrum.

Another embodiment of the invention may also provide a layered approach for data communication between the two BNC/FSC enabled devices. In this regard, data may be assigned to a particular layer and only data that is in a particular layer may be communicated based on the distance. A data type may specify what kind of data is in each particular layer. For example, secure data in layer 1 may only be communicated when both devices are less than ½ meter apart. Non-secure data in layer 2 may only be communicated in instances when both devices are less than or equal to 1.5 meters apart. Non-secure data in layer 3 may only be communicated in instances when both devices are less than or equal to 2 meters apart. Non-secure data in layer 4 may only be communicated in instances when both devices are less than or equal to 2.0 meters apart, and so on.

Devices may be identified by, for example, MAC addresses. If a known or trusted device is within a certain range, then communication may be permitted with little or no security based on the device identity. However, once the trusted device is out of range, then security may be required to facilitate communication. For example, a successful challenge may be required for communication to occur.

Figure 8:
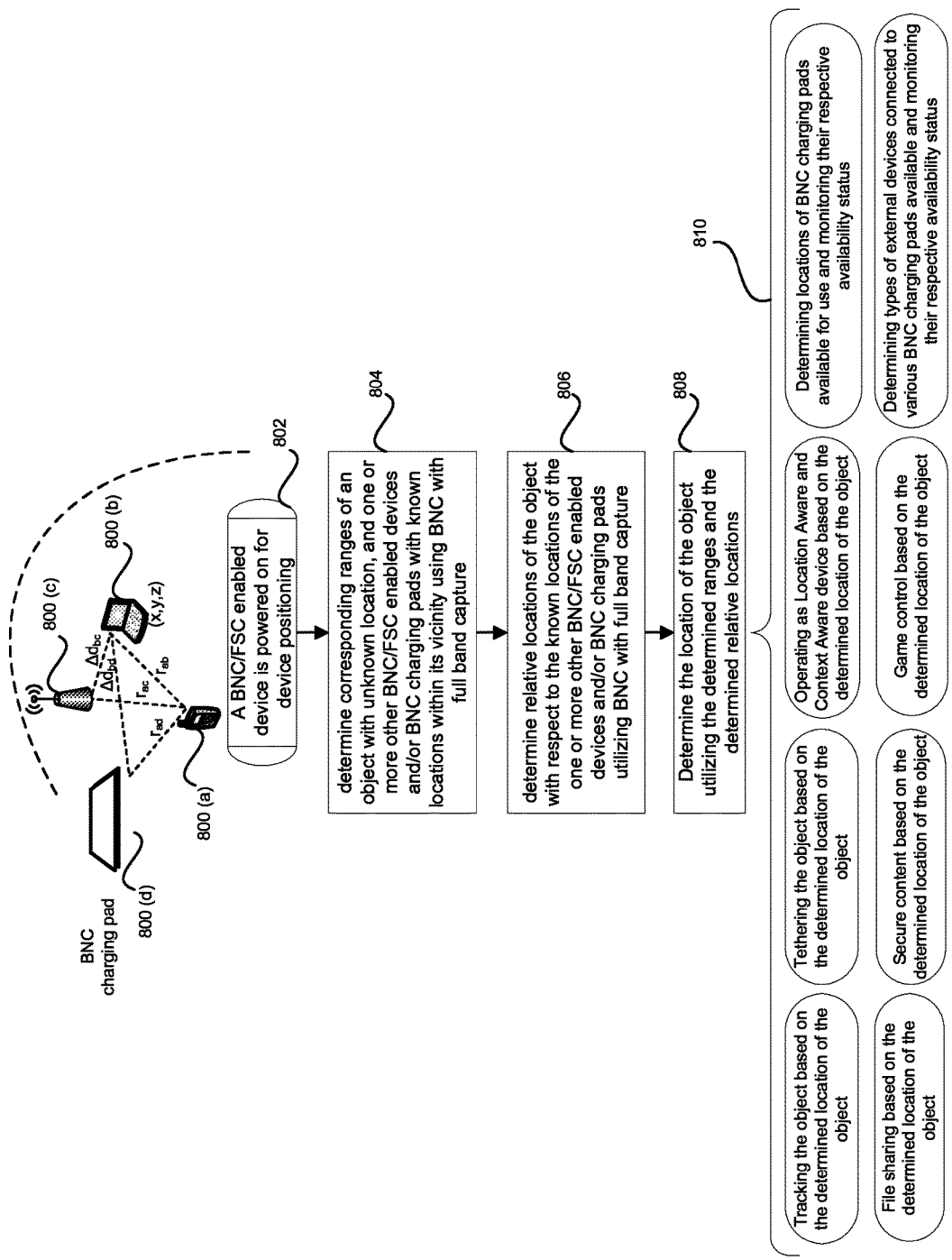
FIG. 8 is a flow diagram that illustrates exemplary steps for positioning an object using, for example, Broadband Near Field Communication (BNC) with full spectrum capture (FSC), in accordance with an exemplary embodiment of the invention.

FIG. 8 is a flow diagram that illustrates exemplary steps for positioning an object using, for example, Broadband Near Field Communication (BNC) with full spectrum capture (FSC), in accordance with an exemplary embodiment of the invention. Referring to FIG. 8, in step 802, a BNC/FSC enabled device 800(*a*) is powered on to determine the position of an object, for example, a BNC/FSC enabled device 800(*b*) and/or a BNC charging pad 800(*d*), within its vicinity. Also, within the vicinity of the BNC/FSC enabled device 800(*a*), there may be one or more other BNC/FSC enabled devices or BNC charging pads with known positions. The one or more other BNC/FSC enabled devices may comprise access points (APs), RFID tags, and other BNC/FSC enabled devices within the vicinity of the BNC/FSC enabled device 800(*a*). In an exemplary embodiment of the invention, hybrid BNC/FSC solutions may be utilized to give or provide a more precise location of an object without relying on received signal strength. A duty cycle burst of low power energy over a large bandwidth may be utilized to determine the range or position of an object or person. In this regard, the hybrid BNC/FSC solutions may be utilized to tell whether an object may have been moved from its current location by, for example, 2 centimeters. This distance may vary based on the BNC/FSC configuration. This may be utilized to track, for example, high value items including laptops, personal effects, assets and so on. Persons may also be tracked in a similar manner.

A BNC/FSC enabled device 800(*a*) may possess the capability to communicate with a plurality of other BNC/FSC enabled devices 800(*b*), 800(*c*) and/or a BNC charging pad 800(*d*) within the vicinity. In this regard, a stolen laptop or tablet with BNC/FSC capability may be operable to send an alert or distress signal to any of a plurality of neighboring devices. The alert of distress signal may comprise a location of the devices. Accordingly, the stolen laptop or tablet may be traced and recovered using any of a plurality of location determining mechanisms such as relative position with respect to other devices with known locations, for example, access points (APs), RFID tags, and other BNC/FSC enabled devices, with a known location such as, for example, from an integrated GPS or based on triangulation. A BNC/FSC enabled device may function as an indoor positioning device.

The exemplary steps start in step 804, where the BNC/FSC enabled device 800(*a*) may be operable to perform ranging to determine corresponding ranges of the BNC/FSC enabled device 800(*b*), and the one or more other BNC capable devices with known positions using BNC links with Full Spectrum Capture. For example, parameters $r_{ab}$, $r_{ac}$, and $r_{ad}$ may represent the determined ranges for the BNC/FSC enabled devices 800(*b*), 800(*c*) and the BNC charging pad 800(*d*) with respect to the BNC/FSC enabled device 800(*a*), respectively.

In step 806, the BNC/FSC enabled device 800(*a*) may determine relative locations of the object (the BNC/FSC enabled device 800(*b*)) with respect to the known locations of the one or more other BNC/FSC enabled devices 800(*c*) and BNC charging pad 800(*d*) utilizing BNC with Full Spectrum Capture. In step 808, the BNC/FSC enabled device 800(*a*) may determine the location of the object (the BNC/FSC enabled device 800(*b*)) utilizing the determined ranges and the determined relative locations.

In an exemplary embodiment of the invention, in step 808, utilizing the determined ranges and the determined relative locations, the BNC/FSC enabled device 800(*a*) may determine the location of the BNC charging pad 800(*d*) automatically when the BNC/FSC enabled device 800(*a*) is low on battery. In step 810, the BNC/FSC enabled device 800(*a*) may utilize the determined location of the object to support various use cases such as, for example, tracking the object (the BNC/FSC enabled device 800(*b*)) based on the determined location of the object. In an exemplary embodiment of the invention, in step 810, the BNC/FSC enabled device 800(*a*) may utilize the determined location of the BNC charging pad to support various use cases. For example, the BNC/FSC enabled device 800(*a*) may utilize the determined location to indicate whether the BNC charging pad 800(*d*) is being used by other BNC/FSC enabled devices, such as the BNC/FSC enabled device 800(*b*). The BNC/FSC enabled device 800(*a*) may utilize the determined location to estimate when the BNC charging pad 800(*d*) may be available for use by the BNC/FSC enabled device 800(*a*) based on the charge level of the BNC/FSC enabled device 800(*b*). The BNC/FSC enabled device 800(*a*) may utilize the determined location determine whether and to what extent the BNC/FSC enabled device 800(*b*) initiated a concurrent transfer of high bandwidth data to an external device such as the external device 903 for example. In an exemplary embodiment of the invention, a BNC/FSC enabled device may also tether itself to a fixed device such as a fixed access point and as a user of the BNC/FSC enabled device walks through a mall or store, location may be determined. As soon as some distance is exceeded, then an alarm or alert may be initiated by an application running on a smartphone or tablet. As the BNC/FSC enabled device moves away and the tether is broken, a new tether maybe formed with another device. This may be utilized to track, for example, criminals, child molesters, and predators, as they move around. GPS or other GNSS technology may also be utilized to pinpoint location as movement is being tracked.

In an exemplary embodiment of the invention, an open tether may be utilized to enable in-building navigation of humans and/or objects. The speed and/or velocity of the BNC/FSC enabled device may also be used to determine its location or relative location with respect to other devices or charging pads. The Doppler from other surrounding sources may be utilized to determine the velocity.

A BNC/FSC enabled device may operate as location aware and context aware device. In an exemplary embodiment of the invention, BNC/FSC enabled devices may be operable to sense the environment. A map of BNC/FSC enabled devices and charging pads within a particular area may be generated and displayed. The map may be part of an application that is displayed on smartphones or tablets. For example, kids may view the map to determine which ones of their friends may be at the mall. A BNC/FSC enabled device may be able to determine whether it is in a room, such as an office, as opposed to being in an auditorium. This information may be combined with GPS information to provide a more precise determination of the environment. The BNC/FSC enabled device may be scaled based on the type of application and also based on the perimeter and surroundings where it is located.

In an exemplary embodiment of the invention, a file may be shared with conference participants in a conference room. The file may be opened and viewed by every participant in the room. However, if a participant leaves the conference room, then a lock is placed on the document and the document may no longer be viewed. If that participant re-enters the room, the document will again be viewable.

In an exemplary embodiment of the invention, a BNC/FSC enabled device may determine the location of BNC charging pads and the types of external devices connected to the respective BNC charging pads. For example, a conference presenter may want to stream a high bandwidth data to an HD Television. In this regard, a BNC/FSC enabled device may generate and display a map of BNC charging pads and may indicate whether the respective BNC charging pads are available for steaming high bandwidth data.

With a sufficiently high SNR, location may be resolved within a fraction of a wavelength, which translates to within a foot or less at 1 GHz.

In one exemplary embodiment of the invention, two BNC/FSC enabled devices may be electronically tethered. The moment one of the devices moves out of a certain range of the other device, authentication or re-authentication may be required. The level of authentication required may vary depending of the distance of the two devices.

In an exemplary embodiment of the invention, user A is streaming a movie from their smartphone to a HD Television using BNC/FSC. User A's kids are currently watching this movie on the HD Television. User A gets up to take a call on the smartphone and starts moving away from the HD Television. As user A moves away from the HD Television, the bandwidth for the connection may decrease and the quality of the movie may start to deteriorate. User A may reach a point where a security issue arises because an unauthorized device may be able to pick up the streamed movie signal. When this occurs, the link may be dropped or user A may be requested to re-authenticate using a stronger key.

Wireless tethering may be provided for objects and/or persons. In this regard, BNC/FSC may enable the location of objects, animals and persons. For example, BNC/FSC may be utilized to determine whether a child is out of range without the need to measure and compare received signal strength. For devices, while they are tethered, there may be no need to authenticate. However, once the tether is broken, authentication may automatically be required.

In an exemplary embodiment of the invention, BNC/FSC enabled devices may be used as a gaming controller since the resolution in position may be adjusted with fair accuracy. For example, three (3) BNC/FSC enabled devices may be utilized and triangulation may be utilized to determine a position of a person or a body part such as a hand relative to the BNC/FSC enabled devices. BNC/FSC sensors may also be place on the gamer's body to aid in more accurately determining the location of a person or the person's hand, for example.

Accelerometer and/or gyroscope information for devices may be shared among a plurality of BNC/FSC enabled devices and utilized to assist with the gaming control or other interactive events. Limiting the number of participants to a communication session may provide additional security. For example, the number of participants may be limited to 5 and if a 6th person enters the room, connection is denied.

FIG. 9 is a diagram showing an exemplary near-field charging and communication system 900 that utilizes, for example, BNC/FSC, in accordance with an exemplary embodiment of the invention. Referring to FIG. 9, there is shown a BNC charging pad 901, a plurality of BNC/FSC enabled devices 902*a*, 902*b*, a data transfer link 904 and an external device 903.

The BNC charging pad 901 may comprise suitable logic, circuitry, code and interfaces that may be operable to concurrently charge a BNC/FSC enabled devices such as the BNC/FSC enabled device 902*a* or 902*b* and facilitate high bandwidth data transfer from the BNC/FSC enabled device 902*a* or 902*b* to an external device, such as the external device 903 for example. For example, the BNC charging pad 901 may include a coil (not shown) that enables concurrent charging and transfer of high bandwidth data. The BNC charging pad 901 may enable transfer of high bandwidth data from the BNC/FSC enabled device 902*a* through the data transfer link 904 to an external device, such as the external device 903 for example. The BNC charging pad 901 may also comprise a converter (not shown) to convert BNC data received from the BNC/FSC enabled device 902*a* to a data format suitable for transmission over the data transfer link 904. For example, if the data transfer link 904 comprises a USB cable, the converter may convert the BNC data received from the BNC/FSC enabled device 902*a* into a USB standard data format.

A BNC/FSC enabled device such as the BNC/FSC enabled device 902*a* may comprise suitable logic, circuitry, code and interfaces that may be operable to perform Broadband Near-Filed Communication (BNC) with other BNC/FSC enabled devices. The BNC/FSC enabled device 902*a* may include all or some of the characteristics and functionalities as described with respect to the BNC/FSC enabled devices 110*a*-100*c* depicted in and described with respect to FIG. 1, for example, and the BNC/FSC enabled device 200 as depicted in and described with respect to FIG. 2, for example.

The external device 903 may comprise suitable logic, circuitry, code and interfaces that may be operable to send and receive data over the data transfer link 904. The external device 903 may comprise an HD Television, laptop computer, desktop computer, and/or other suitable device that can be communicatively coupled with a BNC charging pad, such as the BNC charging pad 901, via a data transfer link, such as the data transfer link 904.

The data transfer link 904 may comprise suitable logic, circuitry, code and interfaces that may be operable to facilitate transfer of data from the BNC charging pad 901 to the external device 903. The data transfer link 904 may be operable to enable transmission of data in both directions. The data transfer link 904 may comprise a USB, HDMI, FireWire, thunderbolt, and/or other suitable data transfer interface.

In an exemplary operation, a BNC/FSC enabled device, such as the BNC/FSC enabled device 902*a* may be placed on a BNC charging pad, such as the BNC charging pad 901 which would initiate concurrent charging of the BNC/FSC enabled device 902*a* and high bandwidth data transfer from the BNC/FSC enabled device 902*a* to the external device 903. For example, when the BNC/FSC enabled device 902*a* is placed on the BNC charging pad 901, the BNC charging pad 901 may initiate data transfer of random data from the external device 903 through the data transfer link 904 to generate current to flow through the circuitry and/or electronic elements of the BNC charging pad 901. The BNC charging pad 901 may then use the current to charge the BNC/FSC enabled device 902*a*. In this regard, the BNC/FSC transceiver 1010 may energize one or more coils in the BNC charging pad 901, which may in turn energize one or more coils in the BNC/FSC enabled device 902*a* so as to charge the BNC/FSC enabled device 902*a*. The transfer of energy between the BNC charging pad 901 and the BNC/FSC enabled device 902*a* may be inductive and/or capacitive. The transfer of random data may continue until the BNC/FSC enabled device 902*a* is either removed from the BNC charging pad 901, the BNC/FSCenabled device 902*a* is fully charged and/or when the BNC/FSC enabled device initiates a high bandwidth data transfer to the external device 903. When the BNC/FSCenabled device 902*a* initiates a high bandwidth data transfer to the external device 903, the BNC charging pad 901 may stop the transfer of the random data from the external device 903 and may instead convert the data received from the BNC/FSC enabled device 902*a* to a data format acceptable by the data transfer link 904 and cause the data to be transferred to the external device 903.

In an exemplary operation, the BNC charging pad 901 may comprise a coil that enables concurrent charging and transfer of high bandwidth data. In this regard, a tablet or a smartphone may be placed on the pad while the tablet or the smartphone is being charged via the coil, raw uncompressed video may concurrently be transferred from the tablet or smartphone to a high definition (HD) television. For example, raw uncompressed 12-bit picture depth video at 30 frames per second (fps) (~750 megabits (payload) per second) may be transferred from the tablet or smartphone to the HD television.

Figure 10:
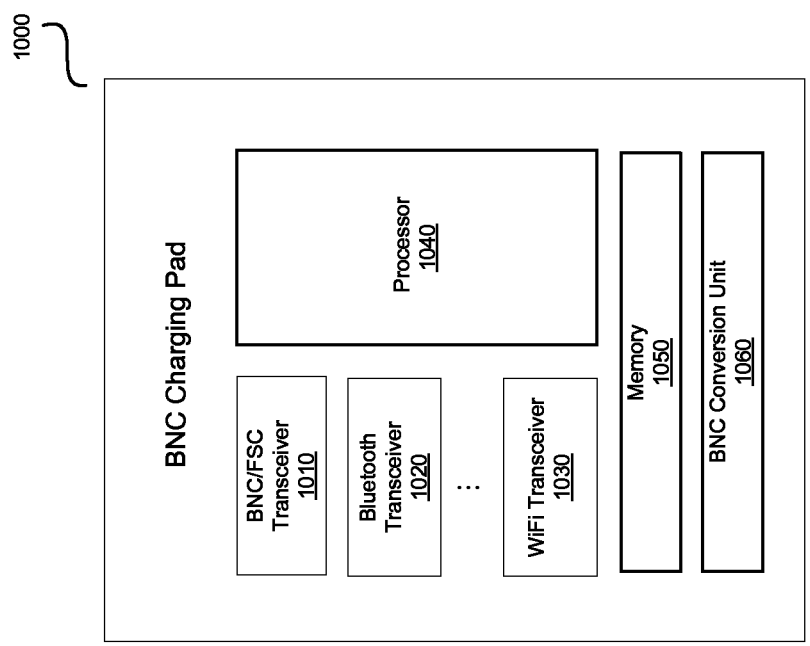
FIG. 10 is a diagram showing an exemplary charging pad that utilizes, for example, BNC, in accordance with an exemplary embodiment of the invention.

FIG. 10 is a diagram showing an exemplary charging pad that utilizes, for example, BNC, in accordance with an exemplary embodiment of the invention. Referring to FIG. 10, there is shown a BNC charging pad 1000 comprising a BNC/FSC transceiver 1010, a Bluetooth transceiver 1020, a WiFi transceiver 1030, a processor 1040, a memory 1050, and a BNC conversion unit 1060. The Bluetooth transceiver 1020 and the WiFi transceiver 1030 may be optional depending on device capabilities, network availabilities and/or user preferences.

The BNC/FSC transceiver 1010 may comprise suitable logic, circuitry, interfaces and/or code that may allow the BNC charging pad and other BNC capable devices and/or BNC/FSC enabled devices to perform communication according to a BNC protocol. The BNC/FSC transceiver 1010 may include all or some of the characteristics and functionalities of as described with respect to the BNC/FSC transceiver 210 depicted in and described with respect to FIG. 2 for example. In an exemplary embodiment of the invention, the BNC/FSC transceiver 1010 may be operable to receive data from BNC capable devices utilizing BNC so as to generate current in all or some of the components of the BNC charging pad 1000. In that regard, the current generated by the BNC/FSC transceiver 1010 may enable the BNC charging pad 1000 to charge the BNC capable device.

The Bluetooth transceiver 1020 may comprise suitable logic, circuitry, interfaces and/or code that may be operable to communicate Bluetooth radio signals over the Bluetooth network 124. The Bluetooth transceiver 1020 may include all or some of the characteristics and functionalities of as described with respect to the Bluetooth transceiver 220 depicted in and described with respect to FIG. 2 for example. The Bluetooth transceiver 1020 may be enabled to support coexistence operations so as to receive Bluetooth signals while utilizing Full Spectrum Capture in the BNC charging pad 1000. In an exemplary embodiment of the invention, the Bluetooth transceiver 1020 may utilize a dedicated RF front-end circuitry for data receiving using Bluetooth. In another exemplary embodiment of the invention, the Bluetooth transceiver 1020 may share a RF front-end circuitry with the BNC/FSC transceiver 1010 for data receiving using Bluetooth. In an exemplary embodiment of the invention, in some instances, the Bluetooth transceiver 1020 may be securely paired with other Bluetooth and BNC capable devices utilizing BNC. In this regard, the BNC/FSC transceiver 1010 may be enabled to exchange authentication information over a BNC link for pairing the Bluetooth transceiver 1020 with other Bluetooth and BNC capable devices.

In an exemplary embodiment of the invention, the Bluetooth transceiver 1020 may be operable to receive data from BNC capable devices utilizing BNC so as to generate current in all or some of the components of the BNC charging pad 1000. In that regard, the current generated by the Bluetooth transceiver 1020 may enable the BNC charging pad 1000 to charge the BNC capable device.

The WiFi transceiver 1030 may comprise suitable logic, circuitry, interfaces and/or code that may be operable to communicate WiFi radio signals over the WiFi network 126. The WiFi transceiver 1030 may include all or some of the characteristics and functionalities of as described with respect to the WiFi transceiver 230 depicted in and described with respect to FIG. 2 for example. The WiFi transceiver 1030 may be enabled to support coexistence operations so as to receive WiFi signals while utilizing Full Spectrum Capture in the BNC charging pad 1000. In an exemplary embodiment of the invention, the WiFi transceiver 1030 may utilize a dedicated RF front-end circuitry for data transmission and reception using WiFi. In another exemplary embodiment of the invention, the WiFi transceiver 1030 may share a RF front-end circuitry with the BNC/FSC transceiver 1010 for data transmission and receiving using WiFi. In an exemplary embodiment of the invention, the WiFi transceiver 1030 may be operable to receive data from BNC capable devices utilizing BNC so as to generate current in of all or some of the components of the BNC charging pad 1000. In that regard, the current generated by the WiFi transceiver 1030 may enable the BNC charging pad 1000 to charge the BNC capable device.

The processor 1040 may comprise suitable logic, circuitry, interfaces and/or code that may be enabled to perform a variety of signal processing tasks such as channel selection or filtering, digital scaling, rate conversion, carrier/time synchronization/recovery, equalization/demapping, and/or channel decoding, for example. The processor 1040 may be operable to facilitate data conversion to and from various data formats acceptable by and from a BNC/FSC enabled device, such as the BNC/FSC enabled device 110a-110c, 200, 901a, and/or 902b and/or acceptable by and from a data transfer link, such as the data transfer link 904 for example.

The processor 1040 may be operable to coordinate and control operations of the BNC/FSC transceiver 1010, the Bluetooth transceiver 1020, and the WiFi transceiver 1030 to communicate corresponding radio signals while utilizing Full Spectrum Capture. In this regard, the processor 1040 may include all or some of the characteristics and functionalities of as described with respect to the processor 240 depicted in and described with respect to FIG. 2 for example. In an exemplary embodiment of the invention, the processor 1040 be operable to coordinate and control operations of the BNC conversion unit 106. For example, the processor may 1040 manage, active or deactivate the BNC conversion unit 1060 depending on whether data format conversion is required for transmission over a data transfer link, such as the data transfer link 904 for example.

The processor 1040 may be operable to coordinate and control operations of the BNC charging pad 1000 so as to allow for data transfer from a BNC enabled device to an external device, such as the external device 903, through the BNC charging pad 1000, concurrent with charging the BNC enabled device. The processor 1040 may also be operable to manage, activate or deactivate random data transfer to the BNC charging pad 1000 so as to generate current flow in all or some of the components of the BNC charging pad 1000. For example, the processor 1040 may initiate current flow utilizing random data transmission from an external device, such as the external device 903, in all or some of the components of the BNC charging pad 1000 when a BNC enabled device is placed on the BNC charging pad so as to allow the BNC charging pad 1000 to charge the BNC enabled device. Furthermore, in this regard, when the BNC enabled device initiates a data transfer to the BNC charging pad 1000, the processor 1040, may stop the previously initiated random data transfer from the external device as to allow the data transfer from the BNC enabled device to the BNC charging pad 1000 to generate current in all or some of the components of BNC charging pad 1000. In this regard, the processor 1040 may be operable to coordinate and control operations of the BNC charging pad 1000 so as to use the current flow generated by the data transfer from the BNC enabled device to the BNC charging pad 1000 to, in addition to facilitating the data transfer, concurrently charge the BNC enabled device.

The BNC conversion unit 1060 may comprise suitable logic, circuitry, interfaces and/or code that may be operable to convert data received by an BNC charging pad 1000, such as the BNC charging pad 901, from a BNC/FSC enabled device, such as the BNC/FSC enabled device 110a-110c, 200, 901a, and/or 902b into data format acceptable by a data transfer link, such as the data transfer link 904 for example.

In an exemplary operation, the BNC charging pad 1000 may operate like a BNC/FSC enabled device 200 as described with respect to FIG. 2 for example. Additionally, the BNC charging pad 1000 may be operable to concurrently charge a BNC/FSC enabled device, such as the BNC/FSC enabled device 901a and facilitate the transfer of high bandwidth data from the BNC/FSC enabled device 901a to an external device, such as the external device 903. For example, after the communication between the BNC charging pad 1000 and the BNC/FSC enabled device 902a is established as between any two BNC/FSC enabled devices in accordance with an exemplary embodiment of the invention and described in more detail with respect to, for example, FIGS. 1, 2, 3 and/or 6, the BNC conversion unit 1060 may convert the format of the data received from the BNC/FSC device 902a into a data format acceptable by a data transfer link, such as the data transfer link 904 for example.

Figure 11:
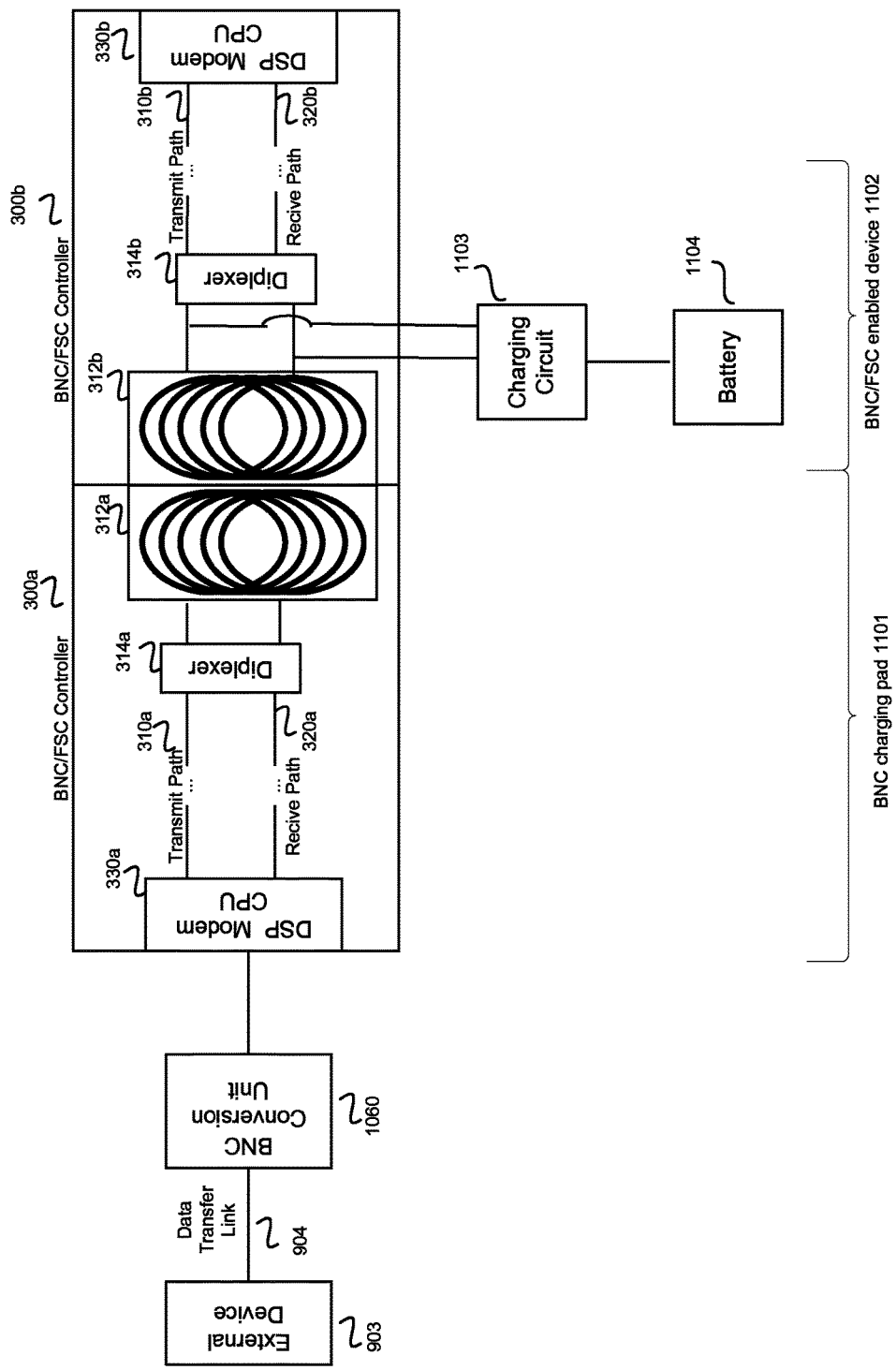
FIG. 11 is a diagram showing an exemplary operation of concurrent charging and high bandwidth data transfer from a device, such as a BNC/FSC enabled device for example, to an external device, in accordance with an exemplary embodiment of the invention.

FIG. 11 is a diagram showing an exemplary operation of concurrent charging and high bandwidth data transfer from a device, such as a BNC/FSC enabled device for example, to an external device, in accordance with an exemplary embodiment of the invention. Referring to FIG. 11, there is shown a BNC charging pad 1101, the BNC/FSC enabled device 1102, the data transfer link 904 and the external device 903. The BNC/FSC enabled device 1102 may comprise a BNC/FSC controller 300b in accordance with an exemplary embodiment of the invention as previously described in detail with respect to the BNC/FSC controller 300 depicted in FIG. 3, the charging circuit 1103, and the battery 1104. The BNC charging pad 1101 may comprise a BNC/FSC controller 300a in accordance with an exemplary embodiment of the invention as previously described in detail with respect to the BNC/FSC controller 300 depicted in FIG. 3, BNC conversion unit 1060, data transfer link 904, and external device 903. The BNC/FSC controller 300a may comprise a BNC power inductive coupling unit 312a and all or some of the elements as previously described in detail with respect to FIG. 3. The BNC/FSC controller 300b may comprise a BNC power inductive coupling unit 312b and all or some of the elements as previously described in detail with respect to FIG. 3, for example.

The charging circuit 1103 may comprise suitable logic, circuitry, code, and/or interfaces that may be operable to receive, manage and/or store charge received from the BNC power inductive coupling unit 312b. The charging circuit 1103 may be operable to manage and supply power received from the BNC power inductive coupling unit 312b to the battery 1104.

The battery 1104 may comprise suitable logic, circuitry, code, and/or interfaces that may enable storage of power sufficient to facilitate the operation of all or some of the components of the BNC/FSC enabled device 1102. The battery 1104 may include all or some of the characteristics and functionalities as described with respect to the battery 260 depicted in and described with respect to FIG. 2 for example.

The BNC conversion unit 1060 may comprise suitable logic, circuitry, interfaces and/or code that may be operable to convert data received by an BNC charging pad, such as the BNC charging pad 1101, from a BNC/FSC enabled device, such as the BNC/FSC enabled device 1102 into data format acceptable by a data transfer link, such as the data transfer link 904 for example.

In an exemplary operation, the BNC charging pad 1101 may be operable to concurrently charge a BNC/FSC enabled device, such as the BNC/FSC enabled device 1102 and facilitate transfer of high bandwidth data from the BNC/FSC enabled device 1102 to an external device, such as the external device 903 for example. In an exemplary embodiment of the invention, when the BNC/FSC enabled device 102 is placed on the BNC charging pad 1101, the BNC charging pad 1101 may initiate data transfer of random data from the external device 903 through the data transfer link 904 to generate current flow through the transmit path 310a of the BNC/FSC controller 300a. The current flow through the BNC power inductive coupling unit 312a may cause current flow in the BNC power inductive coupling unit 312b through utilization of inductive coupling. For example, while the current continues to flow through the BNC power inductive coupling unit 312a, the BNC power inductive coupling unit 312a may generate an electromagnetic field. The electromagnetic field generated by the BNC power inductive coupling unit 312a may induce a current flow in the BNC power inductive coupling unit 312b. The current may flow from the BNC/FSC controller 300b to the charging circuit 1103 causing the battery 1104 to charge.

Concurrent with charging the battery 1104, the BNC charging pad 1101 may be operable to facilitate transfer of high bandwidth data from the BNC/FSC enabled device 1102 to an external device, such as, for example, the external device 903. For example, while the battery 1104 is being charged in accordance with an exemplary embodiment of the invention, the BNC/FSC enabled device 1102 may transfer data through the BNC/FSC controller 300b to the BNC/FSC controller 300a. The transfer of high bandwidth data is in accordance with an exemplary embodiment of the invention as described in more detail with respect to the description of, for example, FIGS. 1, 2, 3 and/or 6. When the high bandwidth data is received by the BNC/FSC controller 300a, it is sent on the receive path 320a to the DSP/Modem/CPU unit 330a and processed there in accordance with an exemplary embodiment of the invention as described in more detail with respect to FIG. 3. The data is subsequently sent to the BNC conversion unit 1060 where the format of the data is converted into a format acceptable by the data transfer link 904. Upon conversion, the data is sent over the data transfer link 904 to the external device 903.

Figure 12:
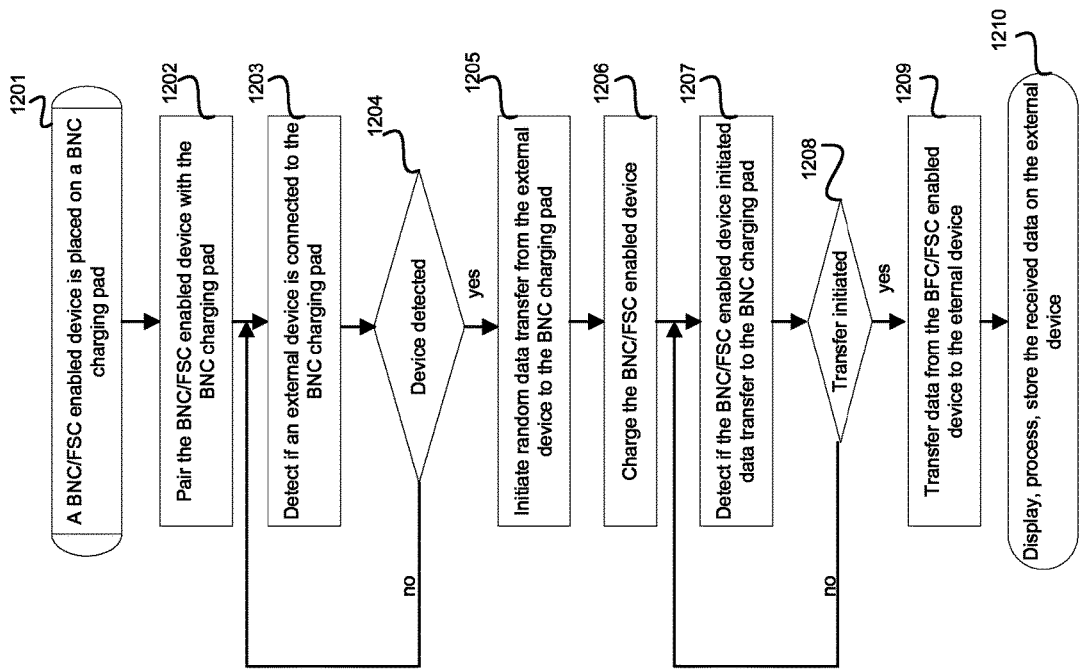
FIG. 12 is a flow diagram that illustrates exemplary steps for concurrent charging of a BNC/FSC enabled device and a high bandwidth data transfer from the BNC/FSC enabled device to an external device in accordance with an exemplary embodiment of the invention.

FIG. 12 is a flow diagram that illustrates exemplary steps for concurrent charging of a BNC/FSC enabled device and a high bandwidth data transfer from the BNC/FSC enabled device to an external device in accordance with an exemplary embodiment of the invention. Referring to FIG. 12, in step 1201, the BNC/FSC enabled device 200 is placed on the BNC charging pad 1000. The exemplary steps start in step 1202, where the BNC/FSC enabled device 200 is paired with the BNC charging pad 1000. The paring is accomplished in accordance with an exemplary embodiment of the invention as described in detail with reference to FIG. 6 for example.

In step 1203, the BNC charging pad 901 may be operable to determine whether an external device, such as the external device 903 is connected to the BNC charging pad through a data transfer link, such as the data transfer link 904 for example. For example, the DSP/modem, CPU unit 330a may be operable to determine whether the external device 903 is connected to the BNC charging pad 901 through the data transfer link 904. In step 1204, the BNC charging pad 901 may determine whether an external device, such as the external device 903 is connected to the BNC charging pad through a data transfer link, such as the data transfer link 904 for example. In instances where the external device 904 is connected to the BNC charging pad 901, then in step 1205 the BNC charging pad 901 may initiate random data transfer from the external device 903 to the BNC charging pad 901. For example, the DSP/Modem/CPU unit 330a may generate a noise signal which may be sent on the transmit path 310a to the BNC power inductive coupling unit 312a. In this regard, the noise signal would generate current flow in the transmit path 310a and/or in the BNC power inductive coupling unit 312a.

In step 1206, the BNC/FSC enabled device may be charged. In this regard, the current generated in the BNC power inductive coupling unit 312a in step 1205 may generate an electromagnetic field. The electromagnetic field may generate current flow in the BNC power inductive coupling unit 312b. The current generated in the BNC power inductive coupling unit 312b may flow to the charging circuit 1103. The charging circuit may charge the battery 1104 by utilizing the current flowing from the BNC power inductive coupling unit 312b.

In step 1207, the BNC charging pad 901 may be operable to determine whether the BNC/FSC enabled device 200 initiated high bandwidth data transfer to the BNC charging pad 901. For example, the DSP/modem, CPU unit 330a may be operable to determine whether current is present on the receive path 320a. In this regard, when the BNC/FSC enabled device 200 initiates high bandwidth data transfer current flowing through the BNC power inductive coupling unit 312b generates an electromagnetic field. The electromagnetic field generated by the BNC power inductive coupling unit 312b induces current flow in the BNC power inductive coupling unit 312a. The current then flows through the receive path 320a into the DSP/modem/CPU unit 330a. The DSP/modem/CPU unit 312a detects the current from the receive path 320a and detects that the high bandwidth data transfer was initiated by the BNC/FSC enabled device. In step 1208, the BNC charging pad 901 may determine whether the BNC/FSC enabled device 200 initiated high bandwidth data transfer to the BNC charging pad. In instances where the BNC/FSCenabled device 200 initiated the high bandwidth data transfer, then in step 1209, the BNC charging pad 901 facilitates the transfer of the high bandwidth data from the BNC/FSC enabled device 200 to the external device 903. The data from the BNC/FSC enabled device 200 may be sent to the BNC charging pad 901 in accordance with an exemplary embodiment of this invention, as described in detail with reference to FIG. 3 for example. The format of the data may then be converted by the BNC conversion unit 1060 into a data format acceptable to be sent over the data transfer link 904. The data may be sent by the BNC charging pad 901 through the data transfer link 904 to the external device 903.

In step 1210, the data received by the external device may be displayed, processed and/or stored on the external device 903. In step 1204, in instances where the external device 904 is not connected to the BNC charging pad 901, then the exemplary steps return to step 1203. In step 1208, in instances where the BNC/FSC enabled device 200 did not initiate the high bandwidth data transfer, then the exemplary steps return to step 1207.

In various exemplary aspects in a method and system for Broadband Near-Field Communication (BNC) utilizing Full Spectrum Capture (FSC) supporting concurrent charging and communication, a charging device, for example the BNC charging pad 1000, includes an integrated broadband transceiver, for example the integrated BNC/FSC transceiver 1010, which is operable to communicate wireless signals at a power level that is below a spurious emissions mask. The wireless signals are communicated over a designated frequency spectrum band via one or more antennas. The wireless signals convey data between the charging device and a communication device via one or more usable channels within the frequency spectrum band utilized by the integrated broadband transceiver 1010. Concurrent with the communicating of the wireless signals, charging of the communication device occurs. In addition to BNC devices sharing antennas and/or circuitry with wireless power devices, the BNC devices may also share antenna and/or circuits with NFC devices. In other embodiments of the invention, the BNC devices may also share antenna and/or circuits with wireless power devices and also with NFC devices.

One or more usable channels within the frequency spectrum band utilized by the integrated broadband transceiver may be detected. The charging and the communication of the wireless signals may occur currently on the same ones of at least a portion of the one or more antennas or on different ones of at least a portion of the one or more antennas. The detected one or more usable channels may be aggregated and utilized for the communication by the integrated broadband transceiver. In various embodiment of the invention, the charging device may comprise other types of charging devices and is not limited to the BNC charging pad 1000.

In other exemplary aspects in a method and system for Broadband Near-Field Communication (BNC) utilizing Full Spectrum Capture (FSC) supporting concurrent charging and communication, a BNC charging pad such as the BNC charging pad 1000, for example, may be integrated within a communication device such as the BNC/FSC enabled device 200 for example. The BNC charging pad 1000 comprises an integrated BNC/FSC transceiver 1010, which operates in a designated frequency spectrum band. The BNC/FSC transceiver 1010 may be operable to detect and aggregate usable channels within the entire frequency spectrum band that is designated for its operation. The BNC/FSC transceiver 1010 may utilize one or more of the detected channels to wirelessly communicate data with a communication device such as BNC/FSC enabled device 200 for example.

In an exemplary embodiment of the invention, the BNC/FSC transceiver 1010 may be operable to pair with the BNC/FSC enabled devices 200 utilizing BNC protocols. In this regard, the BNC/FSC transceiver 1010 may be configured with various security levels during the pairing, as illustrated in FIG. 8 for example. The BNC/FSC transceiver 1010 may utilize the determined security levels to communicate the data with the BNC/FSC enabled devices 200. The BNC/FSC transceiver 1010 may wirelessly communicate data with the BNC/FSC enabled devices 200 utilizing one or more of the detected channels and utilizing the determined security levels. The BNC/FSC transceiver 1010 may enable the BNC charging pad 1000 to concurrently communicate the data with the BNC/FSC enabled device 200, and charge the BNC/FSC enabled device 200. The BNC/FSC transceiver 1010 may utilize one or more coils in the BNC charging pad 1000 to charge the BNC/FSC enabled device 200 through induction. In this regard, the BNC/FSC enabled transceiver 1010 may utilize the communication from the BNC/FSC enabled device 200 to generate current in all or some of the components of the BNC charging pad 1000 so as to facilitate concurrent charging of the BNC/FSC enabled device 200. The BNC/FSC transceiver 1010 may energize one or more coils in the BNC charging pad 1000, which may in turn energize one or more coils in the BNC/FSC enabled device 200 so as to charge the BNC/FSC enabled device 200.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for concurrent charging and communication.

Although this disclosure makes various references to BNC and near-field communications in general, in some implementations communications described above as using near-field communications may also or alternatively use transition zone (distances between near field and far field) communications and/or far-field communications. Accordingly, aspects of the present invention, including various devices, protocols, and systems described herein using "BNC" or "near-field" modifiers, should be considered as disclosing corresponding transition zone and fair-field devices, protocols, and systems. Therefore, a claim term should not be construed as being necessarily limited by the terms "BNC" or "near-field" unless such modifiers are explicitly recited in the claim with respect to such claim term.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
performing by a near field communications tag that supports a passive mode and comprises a control unit, a modulator, and a demodulator:
communicating, by said near field communications tag, wireless signals at a power level that is below a spurious emissions mask, wherein:
said wireless signals are communicated over a designated frequency spectrum band via one or more antennas;
said wireless signals convey data between said near field communications tag and a first device via one or more usable channels within said frequency spectrum band;
during transmission, said one or more usable channels are generated digitally by the near field communications tag, and
during reception, said frequency spectrum band is digitized by the near field communications tag prior to frequency conversion;
concurrent with said communicating, making energy harvested from said wireless signals available via one or more conductors such that said energy may be used by a second device; and
pairing said near field communications tag with said second device.

2. The method according to claim 1, comprising:
detecting said one or more usable channels within said frequency spectrum band utilized by said near field communications tag; and
aggregating said detected one or more usable channels for said communicating by said near field communications tag.

3. The method according to claim 1, comprising coupling a battery of said second device via said one or more conductors to enable charging.

4. The method according to claim 1, comprising configuring said near field communications tag with security levels during said pairing.

5. The method according to claim 4, comprising communicating said data with said first device based on a selected one of said security levels.

6. The method according to claim 1, comprising storing, in memory of said near field communications tag, information for configuring a WiFi transceiver that is integrated into a third device along with said near field communications tag.

7. The method according to claim 1, comprising storing, in memory of said near field communications tag, information for configuring a Bluetooth transceiver that is integrated into a third device along with said near field communications tag.

8. The method according to claim 1, wherein said second device comprises a WiFi radio.

9. The method according to claim 1, wherein said second device comprises a Bluetooth radio.

10. A system, comprising:
a near field communications tag that supports a passive mode and comprises a control unit, a modulator, and a demodulator, said near field communications tag being operable to:
communicate wireless signals at a power level that is below a spurious emissions mask, wherein:
said wireless signals are communicated over a designated frequency spectrum band via one or more antennas;
said wireless signals convey data between said field communications tag and a first device via one or more usable channels within said frequency spectrum band;
during transmission, said one or more usable channels are generated digitally by the near field communications tag, and
during reception, said frequency spectrum band is digitized by the near field communications tag prior to frequency conversion;
concurrent with said communicating, make energy harvested from said wireless signals available via one or more conductors such that said energy may be used by a second device; and
pair said near field communications tag with said second device.

11. The system according to claim 10, wherein said near field communications tag is operable to:
detect said one or more usable channels within said frequency spectrum band utilized by said near field communications tag; and
aggregate said detected one or more usable channels for said communicating by said near field communications tag.

12. The system according to claim 10, wherein said near field communications tag is operable to charge a battery of said second device-through said one or more conductors.

13. The system according to claim 10, wherein said near field communications tag is operable to configure said an integrated broadband transceiver with security levels during pairing.

14. The system according to claim 13, wherein said one or more circuits are operable to communicate said data with said first device based on a selected one of said security levels.

15. The system according to claim 10, wherein said near field communications tag comprises memory operable to store information for configuration of a WiFi transceiver that is integrated into a third device along with said near field communications tag.

16. The system according to claim 10, wherein said near field communications tag comprises memory operable to store information for configuration of a Bluetooth transceiver that is integrated into a third device along with said near field communications tag.

17. The system according to claim 10, wherein said second device comprises a WiFi radio.

18. The system according to claim 10, wherein said second device comprises a Bluetooth radio.

\* \* \* \* \*